(12) United States Patent
Morariu et al.

(10) Patent No.: US 11,922,110 B2
(45) Date of Patent: Mar. 5, 2024

(54) RESPONSIVE DOCUMENT AUTHORING

(71) Applicant: Adobe Inc., San Jose, CA (US)

(72) Inventors: Vlad Ion Morariu, Potomac, MD (US); Yuexi Chen, College Park, MD (US); Christopher Alan Tensmeyer, Columbia, MD (US); Zhicheng Liu, Clarksville, MD (US); Lars Niklas Emanuel Elmqvist, Annapolis, MD (US)

(73) Assignees: Adobe Inc., San Jose, CA (US); University of Maryland, College Park, College Park, MD (US)

( * ) Notice: Subject to any disclaimer, the term of this patent is extended or adjusted under 35 U.S.C. 154(b) by 0 days.

(21) Appl. No.: 17/535,067

(22) Filed: Nov. 24, 2021

(65) Prior Publication Data
US 2023/0161943 A1    May 25, 2023

(51) Int. Cl.
*G06F 40/00* (2020.01)
*G06F 40/106* (2020.01)
(Continued)

(52) U.S. Cl.
CPC .......... *G06F 40/106* (2020.01); *G06F 40/117* (2020.01); *G06F 40/166* (2020.01)

(58) Field of Classification Search
CPC ..... G06F 40/106; G06F 40/166; G06F 40/117
See application file for complete search history.

(56) References Cited

U.S. PATENT DOCUMENTS 8,812,951 B1 * 8/2014 White ................ G06F 40/103
                                                 715/255
10,102,185 B2 * 10/2018 Vernica ............. G06F 40/114
(Continued)

OTHER PUBLICATIONS

Frost, Brad , "Responsive Web Design Patterns", GitHub, Inc. [online][retrieved Sep. 16, 2021]. Retrieved from the Internet <https://bradfrost.github.io/this-is-responsive/patterns.html#layout>., 2016, 7 Pages.

(Continued)

*Primary Examiner* — Barbara M Level
(74) *Attorney, Agent, or Firm* — FIG. 1 Patents

(57) ABSTRACT

Systems and techniques for generating responsive documents are described. Digital content is organized into a structure that defines how content is presented when a document is displayed by a computing device. To generate the responsive document, relationships are defined among different digital content objects, such as groups of content objects to be presented together and content objects that are to be presented as alternatives of one another. Responsive patterns are assigned to grouped content objects, where each responsive pattern defines different layout configurations for displaying grouped content objects based on computing device display characteristics. In some implementations, multiple responsive patterns are assigned to a single content group and individual responsive patterns are associated with activation ranges for display characteristics that activate the responsive pattern. For groups of digital content objects that are assigned multiple responsive patterns, responsive patterns are prioritized to create a hierarchy dictating display of the responsive document.

20 Claims, 16 Drawing Sheets

(51) Int. Cl.
*G06F 40/117* (2020.01)
*G06F 40/166* (2020.01)

(56) References Cited

U.S. PATENT DOCUMENTS

| | | | |
|---|---|---|---|
| 10,614,156 B1* | 4/2020 | Stansell | G06F 40/117 |
| 2005/0055635 A1* | 3/2005 | Bargeron | G06F 40/103 715/251 |
| 2005/0102628 A1* | 5/2005 | Salesin | G06T 1/20 715/764 |
| 2007/0174291 A1* | 7/2007 | Cooper | G06F 16/9577 |
| 2012/0042240 A1* | 2/2012 | Oliveira | G06F 40/106 715/243 |
| 2014/0372874 A1* | 12/2014 | Marseille | G06F 40/174 715/243 |
| 2015/0074516 A1* | 3/2015 | Ben-Aharon | G06F 40/106 715/234 |
| 2015/0135104 A1* | 5/2015 | Osterhoff | G06F 8/20 715/765 |
| 2016/0117308 A1* | 4/2016 | Haider | G06F 3/00 715/217 |
| 2016/0292134 A1* | 10/2016 | Elings | G06F 40/106 |
| 2016/0364398 A1* | 12/2016 | Nelson | G06F 40/106 |
| 2017/0024403 A1* | 1/2017 | Tocchini | G06F 11/3632 |
| 2017/0075547 A1* | 3/2017 | Maclean | G06F 3/04845 |
| 2018/0276182 A1* | 9/2018 | O'Donovan | G06F 8/38 |
| 2020/0372206 A1* | 11/2020 | Fialkow | G06F 16/958 |
| 2021/0056935 A1* | 2/2021 | Beckman | G06F 3/04847 |
| 2021/0141585 A1* | 5/2021 | Prakash | G06F 8/41 |

OTHER PUBLICATIONS

Jacobs, Charles et al., "Adaptive Grid-Based Document Layout", ACM Transactions on Graphics, vol. 22, No. 3 [retrieved Sep. 15, 2021]. Retrieved from the Internet <https://www.microsoft.com/en-us/research/wp-content/uploads/2016/02/AGBDL20-20SIG-GRAPH2003.pdf>., Jul. 2003, 10 Pages.

Krosnick, Rebecca et al., "Expresso: Building Responsive Interfaces with Keyframes", 2018 IEEE Symposium on Visual Languages and Human-Centric Computing (VL/HCC) [retrieved Sep. 15, 2021]. Retrieved from the Internet <http://www-personal.umich.edu/~rkros/papers/Expresso_VLHCC2018.pdf>., Oct. 2018, 9 Pages.

Lin, James et al., "Employing patterns and layers for early-stage design and prototyping of cross-device user interfaces", CHI '08: Proceedings of the SIGCHI Conference on Human Factors in Computing Systems [retrieved Sep. 16, 2021]. Retrieved from the Internet <http://aiweb.cs.washington.edu/research/projects/aiweb/media/papers/tmpHUSOAu.pdf>., Apr. 6, 2008, 11 Pages.

Maudet, Nolwenn et al., "Beyond Grids: Interactive Graphical Substrates to Structure Digital Layout", CHI '17: Proceedings of the 2017 CHI Conference on Human Factors in Computing Systems [retrieved Sep. 16, 2021]. Retrieved from the Internet <https://www.archives-ouvertes.fr/hal-01609030/document>., May 2, 2017, 13 Pages.

Nichols, Jeffrey et al., "Improving automatic interface generation with smart templates", IUI '04: Proceedings of the 9th international conference on Intelligent user interfaces [retrieved Sep. 16, 2021]. Retrieved from the Internet <http://www.cs.cmu.edu/~jeffreyn/papers/templatesIUI.pdf>., Jan. 13, 2004, 3 Pages.

Schrier, Evan et al., "Adaptive Layout for Dynamically Aggregated Documents", In Proceedings of IUI 2008 [retrieved Sep. 15, 2021]. Retrieved from the Internet <https://www.microsoft.com/en-us/research/wp-content/uploads/2016/02/SchrierIUI08.pdf>., Jan. 13, 2008, 10 pages.

\* cited by examiner

1600

RESPONSIVE DOCUMENT AUTHORING

BACKGROUND

With advances in computing technology, digital content is consumed on an increasingly diverse range of different device types, such as desktops, tablets, mobile devices, and so forth. Digital content designers conventionally create static content layouts that are configured for output by a certain device type. However, these static content layouts designed for output by one device type encounter rendering problems when output by another device type and fail to appear as intended. Some conventional approaches attempt to avoid such rendering problems by designing multiple different layouts, such as one static layout for displaying a website via desktop, another static layout for displaying the website via mobile device, and so forth. However, these conventional approaches require considerable time and effort to create each static layout and are unable to scale to accommodate new devices without creating a new, device-specific, layout.

SUMMARY

Systems and techniques for generating responsive documents are described. To do so, digital content to be included in a document (e.g., a website, an email, an application interface, etc.) is organized into a structure that defines how content is presented when the document is displayed at a computing device. The structured digital content is used to create a single responsive document that presents different layouts, combinations, and alternatives of the structured digital content depending on display characteristics associated with individual computing devices displaying the responsive document. To generate the responsive document, relationships are defined among different digital content objects, such as groups of content objects to be presented together and content objects that are to be presented as alternatives of one another. Responsive patterns are then assigned to content objects grouped by a relationship, where each responsive pattern defines different layout configurations for displaying the grouped content objects based on computing device display characteristics.

In some implementations, multiple responsive patterns are assigned to a particular group of digital content objects and individual responsive patterns are associated with activation ranges for one or more display characteristics that activate the responsive pattern. For groups of digital content objects that are assigned multiple responsive patterns, the responsive patterns are prioritized to create a hierarchy dictating display of the responsive document. The structured content and assigned responsive pattern(s) are then compiled and output as a single responsive document configured to adapt for display by a diverse range of computing devices with different display characteristics.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

DETAILED DESCRIPTION

Overview

Figure 1:
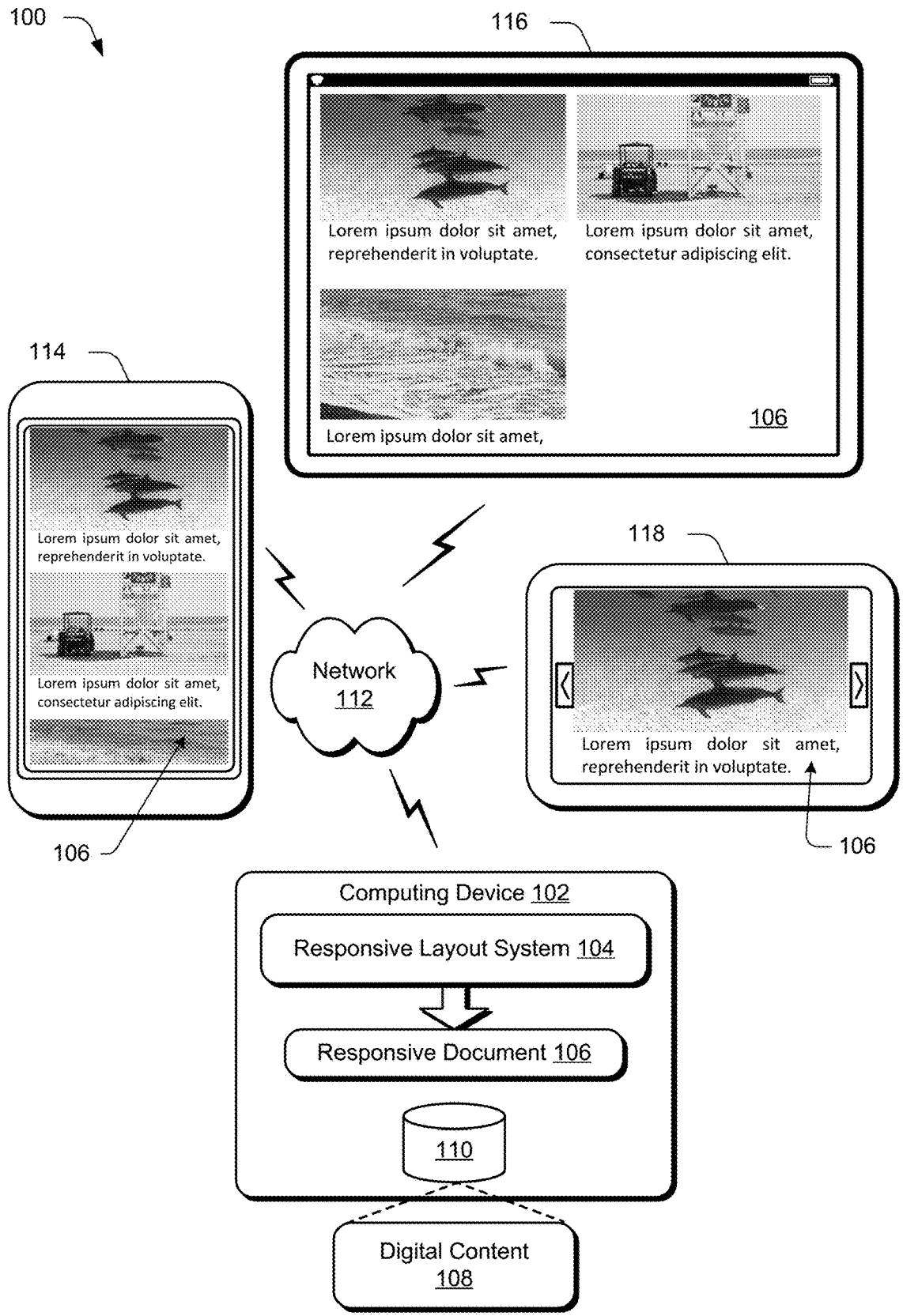
FIG. 1 is an illustration of a digital medium environment in an example implementation that is operable to employ a responsive layout system to generate responsive document that includes at least one responsive pattern for rendering digital content objects.

With digital content being consumed on an ever-increasing range of different computing devices and an escalating demand for customized consumption experiences, designers struggle to develop layouts that adapt to different display configurations. To account for display at different device types, designers often use conventional adaptive layouts that adjust how digital content is displayed based on screen width. In these conventional adaptive layouts, designers manually define different layouts for different width ranges. For instance, a first layout presents digital content in a single column for narrow screens, a second layout presents digital content in two columns for medium screen widths, and a third layout presents digital content in three columns for wide screens.

These conventional layouts have been extended to website and email templates, with width breakpoints used to delineate between widths generally associated with desktop (e.g., wide), tablet (e.g., medium), and phone (e.g., narrow) displays. However, such conventional templates are limited to predefined arrangement of different content types and are unable to accommodate designers' content that differs from a predefined template arrangement.

As an alternative to conventional adaptive layouts, digital content designers encode different versions of a document using code such as JavaScript, HyperText Markup Language (HTML), Cascading Style Sheets (CSS), and so forth. These conventional approaches cause a different version of a document to be produced by executing the code upon consumption of the document (e.g., upon display at a computing device). Although such coding approaches can accommodate additional display device sizes relative to conventional adaptive layouts, coding approaches are time-consuming and require significant development expertise, and fail to account for display characteristics beyond display size (e.g., screen width).

To address these conventional shortcomings, a responsive layout system is described that generates a single responsive document configured to present different layouts, combinations, and alternatives of structured digital content based on display characteristics of various computing devices at which the responsive document is displayed. To generate the responsive document, digital content is organized into a structure that defines how content is presented when the document is displayed at a computing device. Relationships are then defined among different digital content objects, such as groups of content objects to be presented together and content objects that are to be presented as alternatives of one another. Responsive patterns are then assigned to content objects grouped by a relationship, where each responsive pattern defines different layout configurations for displaying the grouped content objects based on computing device display characteristics.

To facilitate intuitive generation of the responsive document, the responsive layout system is configured to provide a user interface that includes controls for organizing digital content objects into a structure and defining relationships among different content objects. In some implementations, responsive patterns are recommended for a group based on the type(s) of digital content objects included in the group. The user interface is configured to output a preview of the responsive document's appearance when displayed using a certain combination of display characteristics, and further includes controls for defining the combination of display characteristics. In addition, the user interface includes controls for defining display characteristics and their associated activation ranges to trigger a responsive pattern, as well as controls for assigning one or more responsive patterns to digital content groups. The structured content and assigned responsive pattern(s) are then compiled and output as a single responsive document configured to adapt for display by a diverse range of computing devices with different display characteristics.

The responsive layout system thus generates responsive documents capable of responding to multiple factors, such as font size, font style, font spacing, device bandwidth, and other characteristics beyond a screen size that impact the document's visual appearance but remain unknown until document consumption.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 is illustrated as including a responsive layout system 104. The responsive layout system 104 is representative of functionality of the computing device 102 to generate a responsive document 106. The responsive document 106 is representative of a structure of digital content 108, such as a plurality of digital objects (e.g., text, images, videos, and so forth) configured for display as a website, an application interface, and so forth. The digital content 108 is thus representative of a plurality of diverse types of digital content objects configured for display as part of a document, such as images, blocks of text, videos, graphics, diagrams, charts, screenshots, and the like. Although described herein in the context of specific examples of digital content 108, the specific examples do not exhaustively describe all possible instances and digital content 108 is representative of any visual aspect included in an electronic document. In some implementations, the digital content 108 is maintained in storage 110 of the computing device 102. Alternatively or additionally, the digital content 108 is maintained in storage of a different computing device connected to the computing device 102 via network 112.

The responsive layout system 104 is configured to organize digital content 108 to be included in the responsive document 106 into a structure that defines one or more groups that include at least one digital content object. In some implementations, the responsive layout system 104 facilitates organization of digital content 108 via a user interface that includes tools enabling a digital content designer to designate groups of digital content objects and relationships between diverse groups, as described in further detail below. As part of generating the responsive document 106, the responsive layout system 104 is configured to assign one or more responsive patterns to individual groups of digital content 108. Each responsive pattern defines a plurality of layout configurations for displaying digital content included in the group to which the responsive pattern is assigned, where a particular one of the layout configurations is presented depending on display characteristics of a computing device displaying the responsive document 106.

For instance, the illustrated example of FIG. 1 depicts three different computing devices 114, 116, and 118 displaying the responsive document 106. In the illustrated example, display characteristics for each of the computing devices 114, 116, and 118 are different from one another. For instance, the computing devices 114, 116, and 118 have different screen sizes, different resolutions, different bandwidth connections to the network 112, different text display settings (e.g., size, spacing, magnification, default font), and so forth, relative to one another. By assigning responsive patterns to distinct groups of digital content 108, the responsive layout system 104 causes the computing devices 114, 116, and 118 to display the responsive document 106 differently, based on the specific display characteristics of the respective computing device.

To further customize a manner in which the responsive document 106 is displayed by different combinations of computing device display characteristics, the responsive layout system 104 is configured to assign different responsive patterns to a single group of digital content 108. The responsive layout system 104 is then configured to designate a range of values for one or more of the computing device display characteristics for activating each of the responsive patterns. In this manner, when the responsive document 106 is output by a computing device having display characteristics that fall within an activation range for a first responsive pattern, grouped digital content 108 is displayed according to the first responsive pattern. Conversely, when the responsive document 106 is output by a computing device having display characteristics that fall within an activation range for a second responsive pattern, the grouped digital content 108 is displayed according to the second responsive pattern. In some implementations, different responsive patterns include overlapping activation ranges for one or more computing device display characteristics. To account for such overlapping activation ranges, the responsive layout system prioritizes responsive patterns, such that a prioritized responsive pattern takes precedence over other responsive patterns assigned to a particular group of digital content 108.

In the context of the illustrated example, assume that computing devices 114 and 116 are each associated with a display characteristic that specifies text should be output at 100% magnification while computing device 118 is associated with a display characteristic that specifies text should be output at 125% magnification. Further in the context of the illustrated example of FIG. 1, assume that the responsive document 106 includes a parent group of digital content 108, where the parent group includes three child groups, and each child group includes an image and a text caption for the image.

In the illustrated example of FIG. 1, the responsive layout system 104 generates the responsive document 106 by assigning a first responsive pattern to the parent group that displays content in columns and designates the first responsive pattern as a default for any combination of display characteristics. Under the first responsive pattern, content is displayed in a number of columns that are determined based on a size of a hardware display (e.g., a screen) of the computing device. The responsive layout system 104 further generates the responsive document 106 by assigning a second responsive pattern to the parent group that displays content in a carousel format, where a number of carousel panes displayed in a given layout are determined based on a size of the hardware display. To define when the second responsive pattern is to be displayed instead of the first responsive pattern, the responsive layout system 104 designates an activation range of 120% text magnification or greater for the second responsive pattern.

Constrained by these example responsive patterns and associated display characteristic activation ranges, computing device 114 is illustrated as displaying the responsive document 106 as a single column navigable via vertical scrolling inputs, computing device displays the responsive document 106 in two columns navigable via vertical scrolling inputs, and computing device 118 displays the responsive document 106 as a carousel that outputs child groups of digital content as a full-screen view, navigable via horizontal scrolling motions or navigation icons. In the illustrated example, computing devices 114 and 116 both display the responsive document 106 in respective layouts defined by the first responsive pattern due to having text magnification display characteristics that do not activate the second responsive pattern. Conversely, by virtue of having a text magnification display characteristic greater than 120%, the computing device 118 displays digital content 108 of the responsive document 106 using the second responsive pattern.

The responsive layout system 104 is thus configured to organize digital content 108 into a structure that separates digital content 108 semantics from the responsive behavior that defines how the digital content 108 is displayed as part of the responsive document 106. Further, the responsive layout system 104 is configured to granularly define specific computing device display characteristics that activate different responsive patterns used to display groups of digital content 108 when displayed as part of the responsive document 106. To enable intuitive generation of the responsive document 106, the responsive layout system 104 provides contextual previews of different responsive patterns that will be displayed according to defined combinations of display characteristics, providing controls that enable a user to define the combinations of display characteristics as preview settings and define activation ranges for individual responsive patterns. The resulting responsive document 106 thus defines a rich range of layouts and alternatives of digital content 108 for presentation based on various combinations of display characteristics constrained by computing device hardware, user-defined settings, or combinations thereof.

Having considered an example digital medium environment, consider now a discussion of an example system useable to generate a responsive document in accordance with the techniques described herein.

Responsive Document Layout System

Figure 2:
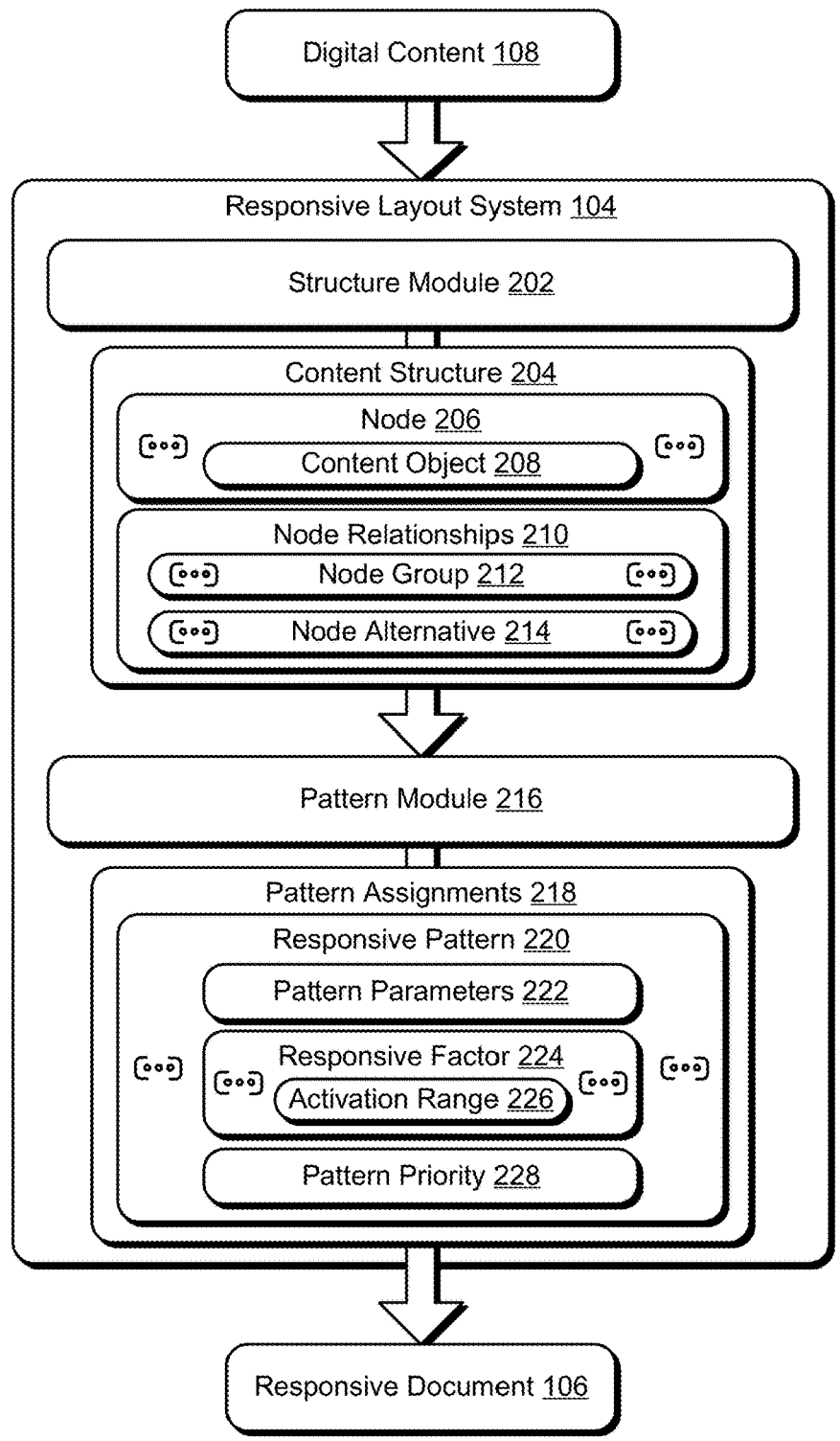
FIG. 2 depicts a digital medium environment showing operation of the responsive layout system of FIG. 1 in greater detail.

FIG. 2 depicts a digital medium environment 200 in an example implementation showing operation of the responsive layout system 104 generating a responsive document 106 in greater detail.

Figure 3:
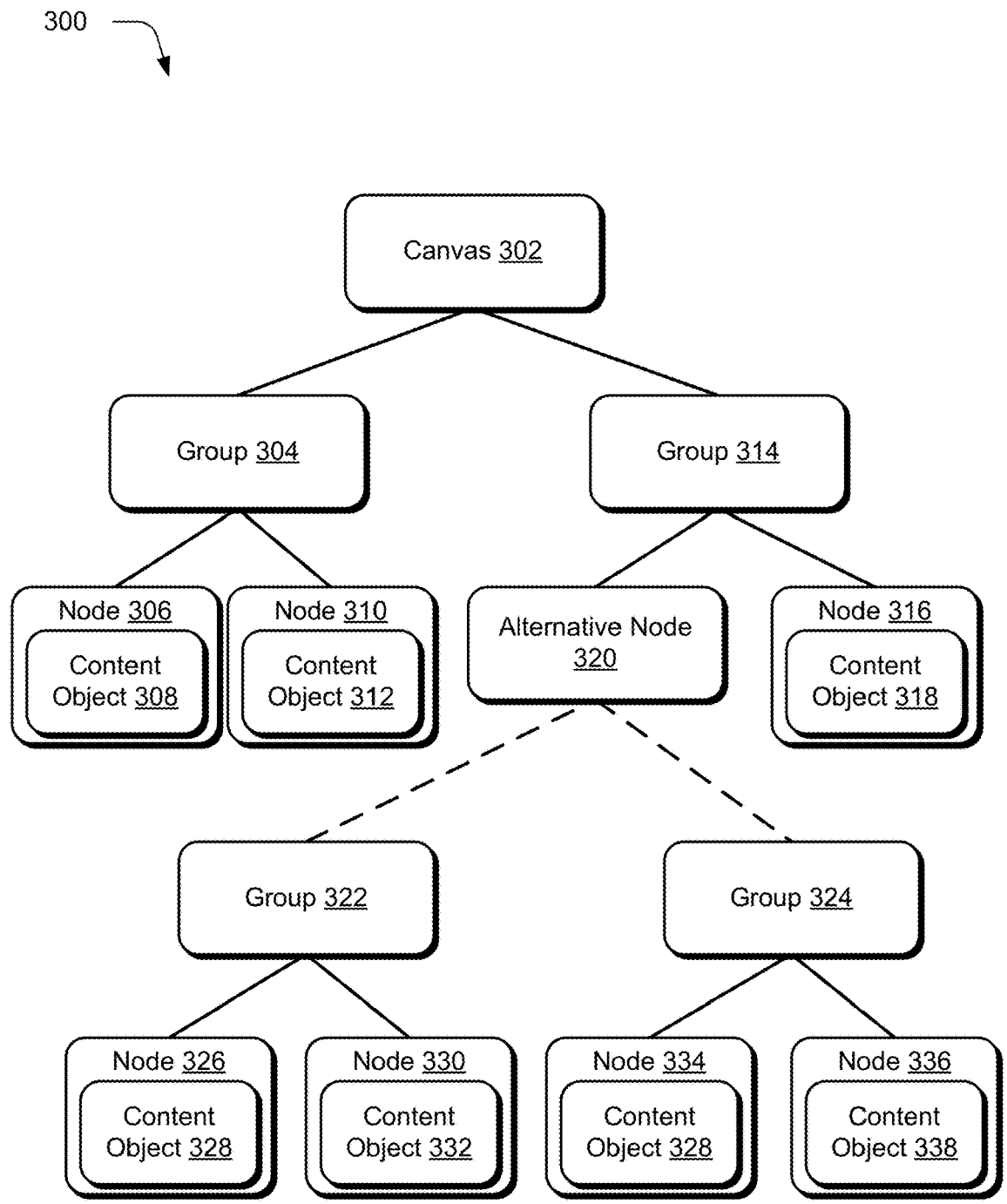
FIG. 3 depicts a digital medium environment in an example implementation of a structured document representation.

FIG. 3 depicts a digital medium environment 300 in an example implementation of a structured document representation used by the responsive layout system 104 to generate a responsive document 106.

Figure 4:
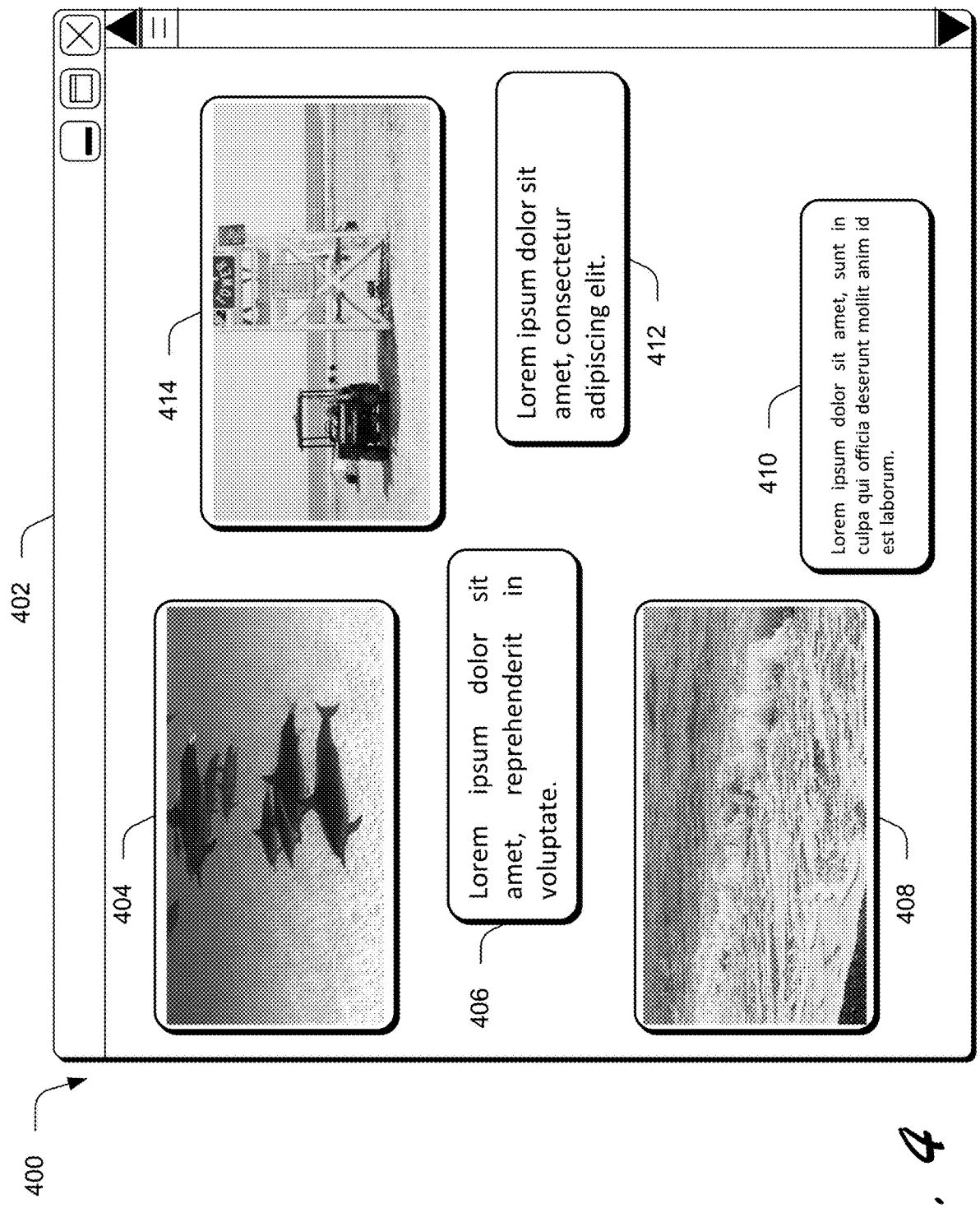
FIG. 4 depicts a digital medium environment in an example implementation of a canvas that includes unstructured digital content objects.

FIG. 4 depicts a digital medium environment 400 in an example implementation of a canvas that includes unstructured digital content objects presented as part of a user interface for the responsive layout system 104.

Figure 5:
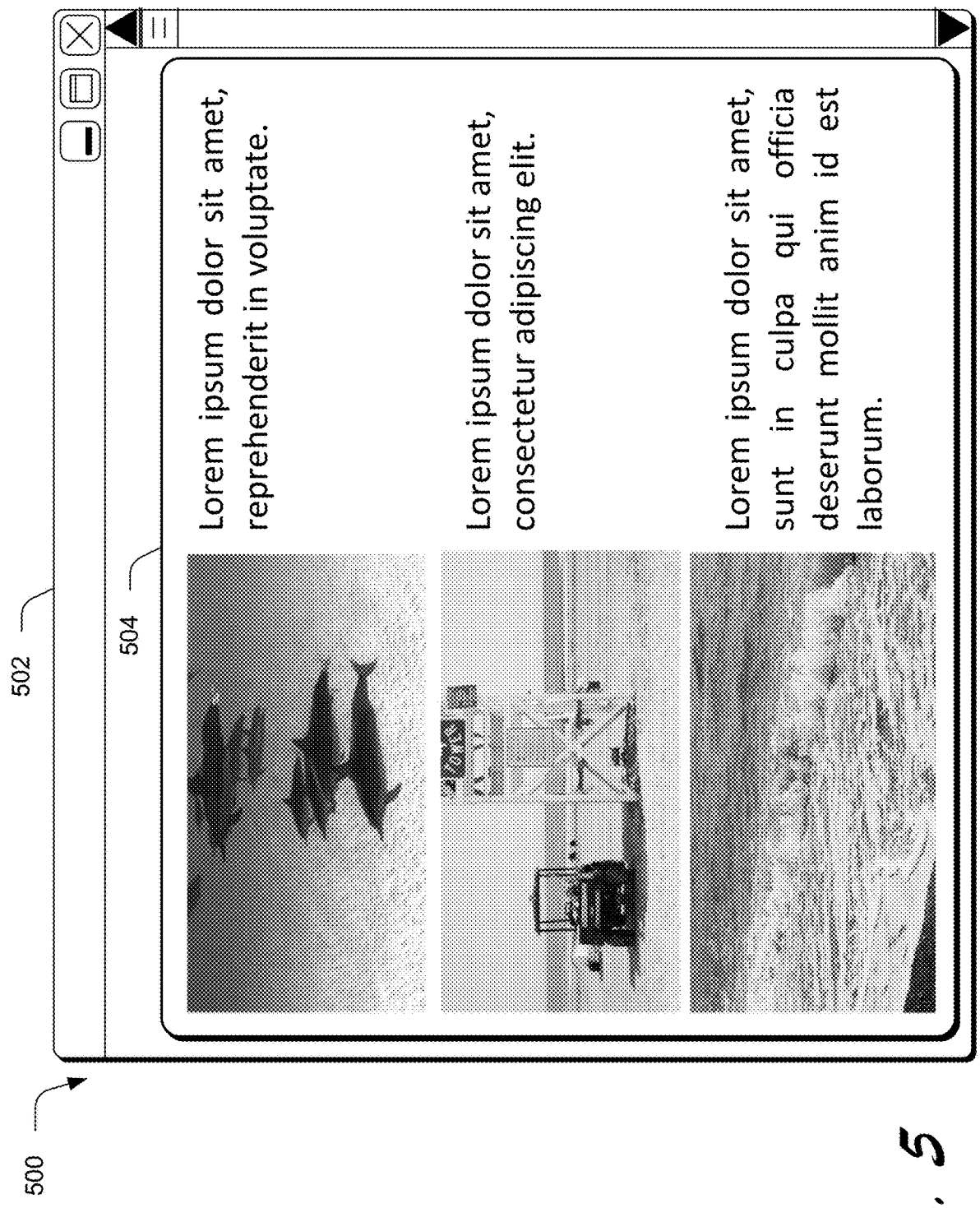
FIG. 5 depicts a digital medium environment in an example implementation of a canvas that includes digital content objects organized in a structure by the responsive layout system of FIG. 1.

FIG. 5 depicts a digital medium environment 500 in an example implementation of a canvas that includes digital content objects organized in a structure by the responsive layout system 104.

FIGS. 6-12 depict digital medium environments 600, 700, 800, 900, 1000, 1100, and 1200 in example implementations of user interfaces for the responsive layout system 104.

Figure 13:
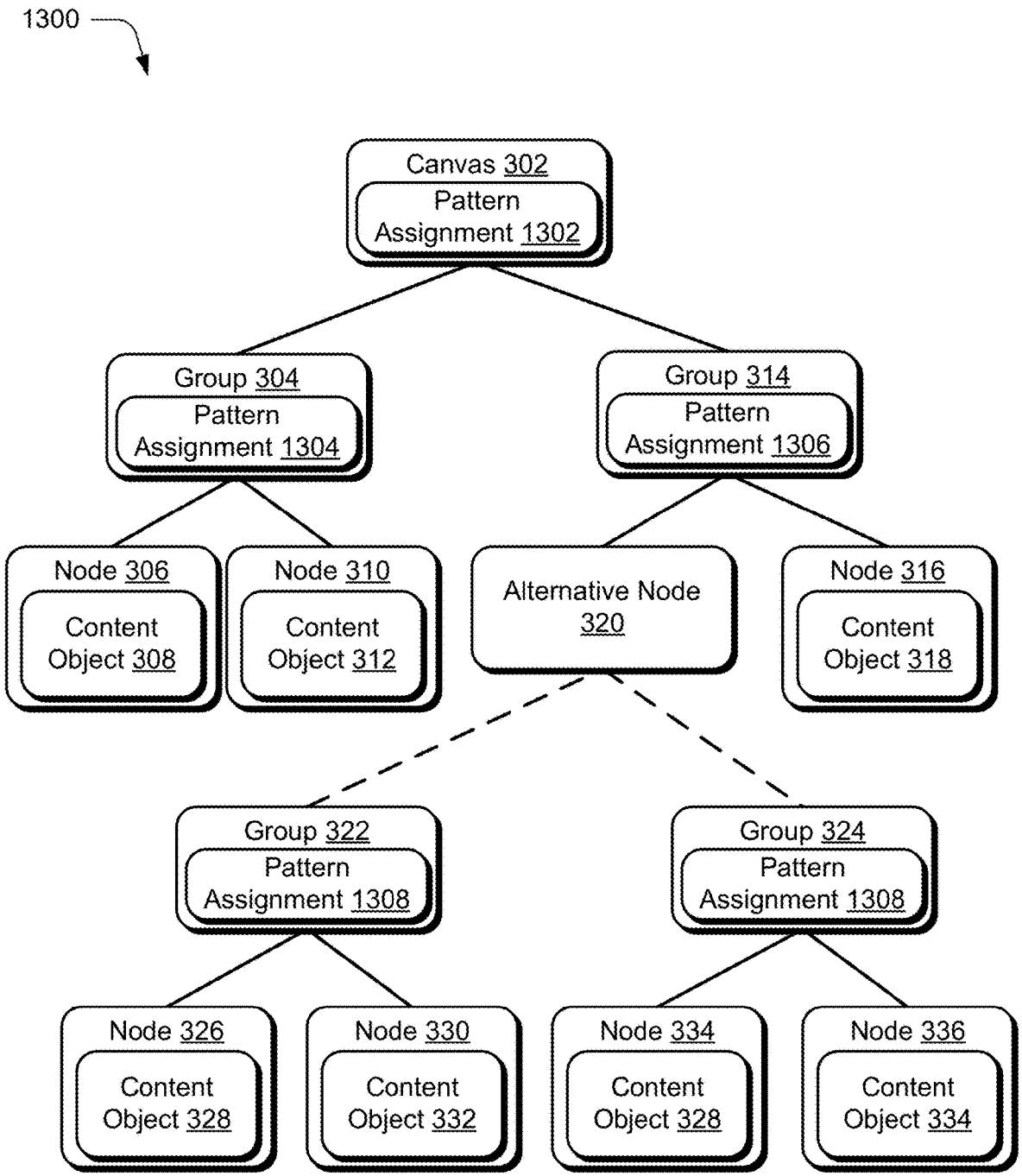
FIG. 13 depicts a digital medium environment in an example implementation of a structured document representation with responsive patterns assigned to digital content groups.

FIG. 13 depicts a digital medium environment 1300 in an example implementation of a structured document representation for a responsive document 106 with responsive patterns assigned to digital content groups.

As illustrated in FIG. 2, the responsive layout system 104 receives digital content 108 to be included in the responsive document 106. The digital content 108 is provided to a structure module 202, which is configured to organize the digital content 108 into a content structure 204. The content structure 204 includes at least one node 206, which includes one or more content objects 208. Each of the one or more content objects 208 is representative of an instance of the digital content 108, such as an image, a block of text, a video, and so forth.

The structure module 202 is further configured to define one or more node relationships 210 for nodes 206 included in the content structure 204. The node relationships 210 include one or more node groups 212, which each define a hierarchical relationship for a group of nodes 206 (e.g., sibling nodes, parent/child nodes, and so forth). Alternatively or additionally, the node relationships 210 include one or more node alternatives 214, which specify nodes 206 that are to be output as alternatives of one another when displaying the responsive document 106, based on display characteristics of a computing device outputting the responsive document 106.

To facilitate organizing the digital content 108 into the content structure 204, the structure module 202 is configured to output one or more user interfaces that provide controls for organizing content objects 208 into nodes 206, provide controls defining node relationships 210, and depict a representation of the content structure 204 for the responsive document 106. For instance, FIG. 3 illustrates an example representation of a content structure 204 for the responsive document 106 in accordance with one or more implementations. In some implementations, the content structure 204 depicted in FIG. 3 is displayed via a user interface of the responsive layout system 104 during creation of the content structure 204, thereby enabling a user of the responsive layout system 104 to define a semantic structure of digital content 108 in the responsive document 106.

The example content structure 204 begins with a blank canvas 302, which is configured to receive instances of digital content 108 for inclusion in the responsive document 106. In some implementations, the canvas 302 is displayed as a user interface of the responsive layout system 104, such that digital content 108 input to (e.g., dragged and dropped, inserted, etc.) the canvas 302 is designated for inclusion in the responsive document 106. FIG. 4 depicts an example of displaying the canvas 302 in a user interface 402, where digital content objects 404, 406, 408, 410, 412, and 414 have been inserted for inclusion as part of the responsive document 106.

Once added to the canvas 302, different content objects 208 are associated with one another to define various nodes 206 and node relationships 210 of the content structure 204. The structure module 202 is configured to enable association of content objects 208 and nodes 206 in a variety of manners. For instance, with respect to FIG. 4, content objects 404 and 406 are associated with one another in response to user input selecting content object 406 and "dragging and dropping" content object 406 onto content object 408 to create a node 206 that includes content objects 404 and 406.

As another example, content objects 408 and 410 are grouped via a region selection (e.g., using a lasso tool) and grouped via selection of a grouping control included in the user interface 402 (not depicted) to create a node 206 that includes content objects 408 and 410. As yet another example, content objects 412 and 414 grouped in response to being placed within a threshold proximity to one another in the canvas 302 to create a node 206 that includes content objects 412 and 414. These example tools for grouping content objects 208 are not exhaustive, and the structure module 202 is configured to facilitate grouping content objects 208 using any suitable technique.

In response to detecting a grouping of content objects 208, the structure module 202 updates the canvas 302 and underlying content structure 204 for the responsive document 106. For instance, FIG. 5 depicts an example instance of the canvas 302 displayed in a user interface 502 of the responsive layout system 104 in response to organizing the example content objects 404, 406, 408, 410, 412, and 414 from FIG. 4 into a content structure 204. Specifically, the illustrated example of FIG. 5 depicts a content structure 504 that includes content objects 404 and 406 assigned to a first node, content objects 408 and 410 assigned to a second node, and content objects 412 and 414 assigned to a third node. By virtue of their simultaneous display in the content structure 504, the illustrated example of FIG. 5 represents a content structure 204 with node relationships 210 specifying that the first, second, and third nodes are siblings to be presented contiguously during display of the responsive document 106.

Returning to FIG. 3, the structure module 202 is configured to update the content structure 204 to reflect additions of content objects 208 to, or deletion from, the canvas 302, as well as reflect groupings of content objects 208 into nodes 206 and relationships among the nodes 206. For instance, in the illustrated example of FIG. 3, group 304 includes node 306 and its assigned content object 308 (e.g., content object 404) as well as node 310 and its assigned content object 312 (e.g., content object 406). Although illustrated as including only one or two nodes for simplicity, a node group 212 is configured to include any number of nodes 206.

Group 304 is defined by a node relationship 210 as being part of a node group 212 with group 314, where group 304 and group 314 are sibling groups disposed at a same hierarchical level with one another. In this manner, the node relationship 210 relating group 304 and group 314 specifies digital content 108 assigned to the respective groups for presentation together during display of the responsive document 106. Group 314 is depicted as including node 316 and its assigned content object 318, as well as alternative node 320. In the illustrated example of FIG. 3, group 314 and alternative node 320 are defined as being part of a node group 212, such that the alternative node 320 is a child of group 314, indicating that a display of digital content 108 assigned to alternative node 320 is dependent on an active display of group 314 in the responsive document 106.

Alternative node 320 is depicted as including group 322 and group 324. As represented by the dashed lines connecting groups 322 and 324 to alternative node 320, groups 322 and 324 are defined by a node relationship 210 as being node alternatives 214 to one another, such that digital content of only one node group (e.g., group 322 or group 324) is output at a given time during display of the responsive document 106. In implementations where a node relationship 210 defines one or more node alternatives 214, a determination of which node alternative to be output is determined via a responsive pattern assignment, as described in further detail below.

For instance, in the illustrated example of FIG. 3, group 322 includes node 326 and its assigned content object 328 as well as node 330 and its assigned content object 332. In contrast, group 324 includes node 334 with its assigned content object 328 as well as node 336 with its assigned content object 338. Thus, outputting digital content represented by alternative node 320 during display of the responsive document 106, involves either displaying content object 328 and content object 332 or displaying content object 328 and content object 338. The display of these content objects associated with group 322 or group 324 is determined by the display characteristics of the computing device displaying the responsive document 106, as constrained by node relationships 210 and responsive patterns assigned to nodes 206 of the content structure 204.

The structure module 202 is thus configured to first organize digital content 108 into a data structure that separates content semantics from a responsive behavior that defines how the digital content 108 is presented as part of the responsive document 106. In doing so, the structure module 202 is configured to output user interfaces that clearly display an organization of the structured digital content and provide tools for defining the structure thereof. After organizing the digital content 108 into the content structure 204, the structure module 202 provides the content structure 204 to a pattern module 216.

The pattern module 216 is representative of functionality of the responsive layout system 104 to designate one or more pattern assignments 218 to one or more nodes 206 in the content structure 204. The pattern assignments 218 dictate a manner in which the content objects 208 of a node 206 are displayed during output of the responsive document 106, based on display characteristics of a computing device outputting the responsive document 106.

To do so, the pattern module 216 assigns a responsive pattern 220 to each node 206 in the content structure 204. As described herein, a responsive pattern 220 is representative of a plurality of layout configurations for displaying content objects 208 of a node 206 based on display characteristics of a computing device outputting the responsive document 106. The plurality of layout configurations for a responsive pattern 220 is represented in FIG. 2 by pattern parameters 222. As an example, a responsive pattern 220 defines a plurality of header-body layouts for displaying digital content that includes a content object 208 as a header relative to other content objects 208 in a node 206 that are displayed as part of a body below the header (e.g., header and body text objects). Various header-body layouts defined by pattern parameters 222 for such an example responsive pattern 220 dictate various font sizes for the header, various font sizes for the body, various padding values between the header and the body, and so forth.

As another example, a responsive pattern 220 defines a plurality of two-object list layouts for displaying two content objects 208 of a node 206 in parallel. Various two-object list layouts defined by pattern parameters 222 for such an example responsive pattern 220 dictate an orientation of the two content objects 208 relative to one another (e.g., horizontal or vertical alignment) relative sizes of the two content objects 208, spacing between the two content objects 208, and so forth.

As yet another example, a responsive pattern 220 includes pattern parameters 222 defining a plurality of main-sidebar layouts for displaying a main content object 208 relative to a sidebar that includes one or more different content objects 208 (e.g., content objects 208 displayed as part of a toolbar or as supplementary information to the main content object). Another example includes pattern parameters 222 for a responsive pattern 220 that define a plurality of image-text layouts for displaying an image content object 208 relative to a text content object 208. As another example, a responsive pattern 220 defines a plurality of grid layouts for displaying multiple content objects 208 in similar sizes and parallel relations, with pattern parameters 222 defining layouts differing based on content object size, spacing, grid dimensions, and so forth.

Another example of a responsive pattern 220 is one that includes a plurality of carousel layouts for displaying a subset of content objects 208 assigned to a node 206. For such an example carousel layout responsive pattern, pattern parameters 222 define a different number of content objects 208 to display at a given time, a different number of content objects to scroll during navigation of the carousel, and so forth. Another possible responsive pattern 220 includes a plurality of flow layouts for displaying content objects 208 in a top-down, left-right read order, where different layouts defined by corresponding pattern parameters 222 present content objects 208 using different numbers and sizes of rows and columns, and so forth.

When output by a computing device (e.g., computing device 114, 116, or 118), a particular layout for a responsive pattern 220 as defined by the pattern parameters 222 is selected based on at least one responsive factor 224 attributable to the computing device. A responsive factor 224 represents a computing device display characteristic that impacts a visual appearance of the responsive document 106. For example, in some implementations a responsive factor 224 is a size (e.g., width, height, etc.) of a display device used by the computing device to output the responsive document 106. As another example, a responsive factor 224 is an orientation of the display device used by the computing device to output the responsive document (e.g., information describing whether a mobile device is currently disposed in a horizontal or vertical orientation). As yet another example, a responsive factor 224 is a user-defined preference specifying a font size (e.g., a font magnification value) to be used when displaying the responsive document 106. Further examples of responsive factors 224 include device bandwidth (e.g., current network connection speed), device display resolution, and so forth. In this manner, a responsive factor 224 represents any computing device display characteristic defined by one or more hardware components, one or more user-designated settings, or combinations thereof, of a computing device outputting the responsive document 106.

In implementations, the specific responsive factors 224 attributable to a computing device (e.g., computing device 114, 116, or 116) impact which layout of a responsive pattern 220 as specified by the pattern parameters 222 is used to display content objects 208 of a node 206 to which the responsive pattern 220 is assigned.

For instance, in an example implementation where a responsive pattern 220 includes a plurality of layouts for displaying content objects 208 in columns, a responsive factor 224 for the responsive pattern 220 is a font magnification value. In this example, the responsive pattern 220 outputs the content objects 208 for a node 206 in a different number of columns based on a font size associated with a computing device displaying the responsive document 106 (e.g., additional columns for smaller font magnification values and fewer columns for larger font magnification values). In some implementations, an individual responsive pattern 220 is associated with multiple responsive factors 224, such that the responsive pattern is configured to adapt a layout display of digital content to accommodate different display characteristics associated with a computing device displaying the digital content.

These example responsive patterns and their associated pattern parameters do not exhaustively describe the possible types of responsive patterns 220 and pattern parameters 222 included in the pattern assignments 218. Rather, the described responsive patterns 220 and their associated pattern parameters 222 are merely representative of possible responsive patterns 220 and pattern parameters 222 assignable by the pattern module 216 to one or more nodes 206 of the content structure 204. In this manner, the pattern module 216 is representative of functionality of the responsive layout system 104 to assign a variety of layouts that define how a structure of semantic content will be displayed when output by computing devices having different display characteristics.

In some implementations, the pattern module 216 is configured to output a recommendation of a responsive pattern 220 for assignment to a node 206 based on the content object(s) 208 included in the node 206. Alternatively or additionally, the pattern module 216 is configured to output a recommendation of a responsive pattern 220 for assignment to a node 206 based on a relationship of the node 206 to one or more different nodes. For instance, in response to detecting that a node 206 includes a text content object 208 and an image content object 208, the pattern module 216 is configured to output a recommendation that responsive pattern 220 defining a plurality of text-image layouts be assigned to the node 206. In some implementations, the pattern module 216 identifies that the content objects 208 of a given node 206 are suitable for organization by a plurality of different responsive patterns 220 and outputs a recommendation of the plurality of different responsive patterns 220 via a user interface of the responsive layout system 104. In such implementations, user input at the user interface selecting a recommended responsive pattern 220 causes the pattern module 216 to assign the selected responsive pattern 220 to a node 206 for which the responsive pattern 220 was recommended. Alternatively or additionally, in some implementations the pattern module 216 is configured to automatically (e.g., independent of user input) assign a responsive pattern 220 to one or more nodes 206 in the content structure 204.

Figure 6:
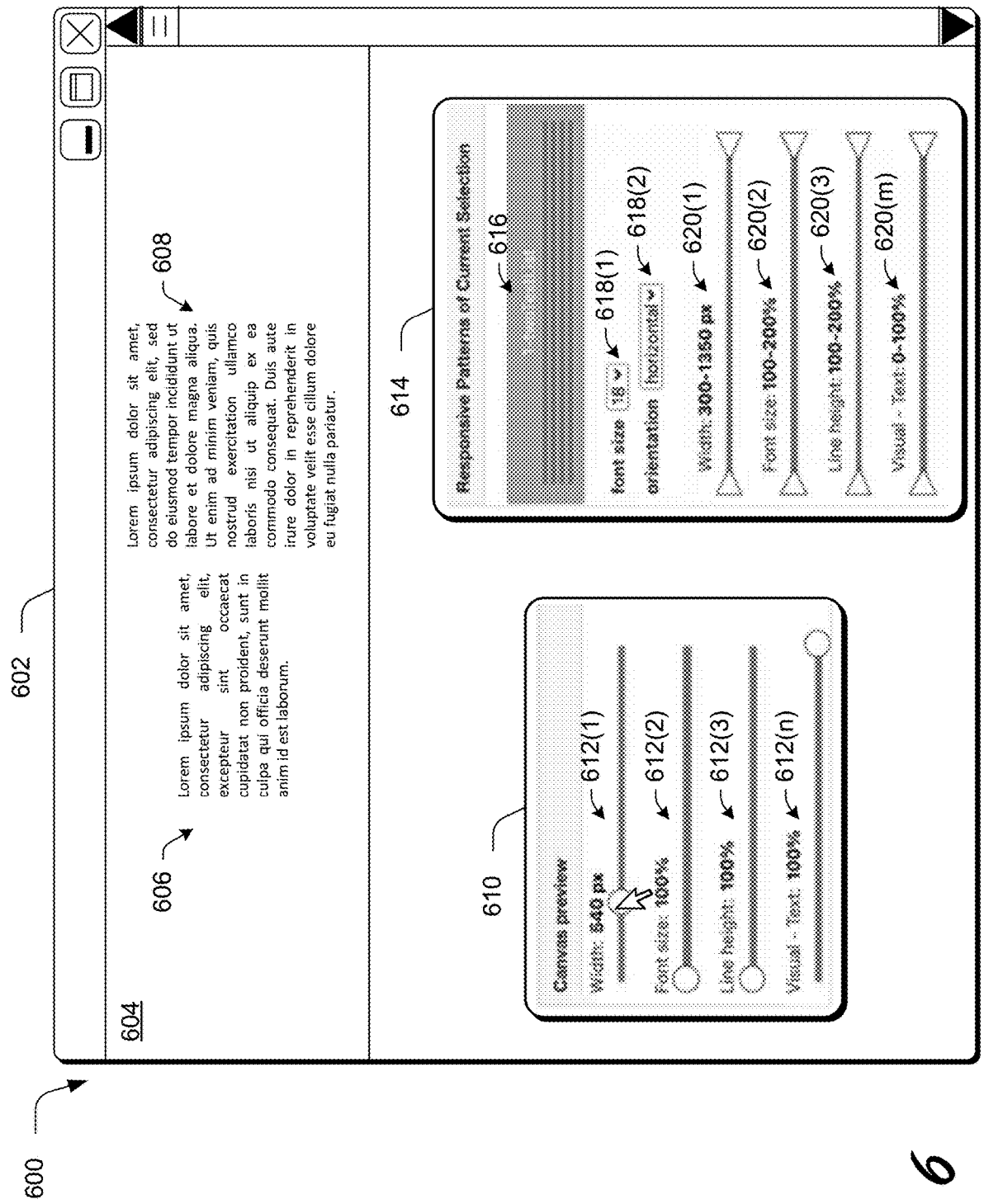
FIGS. 6-12 depict digital medium environments in example implementations of user interfaces for the responsive layout system of FIG. 1.

To assist a user of the responsive layout system 104 in selecting an appropriate responsive pattern 220 for assignment to a given node 206, the pattern module 216 is configured to output a preview of the pattern assignments 218 in a user interface of the responsive layout system 104. For instance, FIG. 6 illustrates an example of a user interface 602 that displays a preview of a resulting appearance for a node 206 when assigned a responsive pattern 220. In the illustrated example, the user interface 602 includes a content preview portion 604. The content preview portion 604 is configured to display one or more content objects 208 of a node 206 to which the responsive pattern 220 is being considered for assignment. In the illustrated example of FIG. 6, the content preview portion 604 displays two text content objects: content object 606 and content object 608.

The user interface 602 is further configured to include a canvas preview portion 610. The canvas preview portion 610 includes one or more controls 612 that are selectable via user input to define preview settings for one or more computing device display characteristics. The preview settings for one or more computing device display characteristics are useable to mimic display characteristics of a computing device outputting the responsive document 106. The user interface 602 is configured to update the content preview portion 604 to display the content objects 606 and 608 as they would be output by a computing device having the same display characteristics as the preview settings.

For instance, in the illustrated example of FIG. 6, the canvas preview portion 610 includes a control 612(1) that is useable to define a width display characteristic, which is representative of a width in pixels of a display device used to output the responsive document 106. The canvas preview portion 610 further includes a control 612(2) that is useable to define a font size associated with a computing device outputting the responsive document 106 (e.g., relative to a default font size of 100%). The canvas preview portion 610 further includes a control 612(3) that is useable to define a line height value associated with the computing device outputting the responsive document 106 (e.g., relative to a default line height value of 100%). Finally, the canvas preview portion 610 includes a control 612($n$) that is useable to define a text magnification value associated with the computing device outputting the responsive document 106 (e.g., relative to a default font magnification value of 100%).

The one or more controls 612 are thus configured to define preview settings for computing device display characteristics defined by hardware components outputting the responsive document 106, computing device display characteristics defined by user-designated settings at a computing device outputting the responsive document 106, or combinations thereof. Input adjusting the value of one or more of the one or more controls 612 causes the content preview portion 604 to update its display of content objects 208 to mimic a manner in which a computing device associated with the preview settings would display the content objects 208. In this manner, a user of the responsive layout system 104 is readily informed as to how a responsive pattern 220 will impact a display of a node's 206 content objects 208 across a range of different display characteristics. Although only four controls 612 are depicted in the illustrated example of FIG. 6, the canvas preview portion 610 is configured to include any number of different controls 612 and n represents any integer.

The user interface 602 further includes a responsive pattern control portion 614. The responsive pattern control portion 614 includes an indication 616 of the responsive pattern 220 that influences display of content objects 208 depicted in the content preview portion 604. For instance, in the illustrated example of FIG. 6, the indication 616 notes that a "twoTextList" responsive pattern 220 is being considered for assignment to a node 206 including content objects 606 and 608. The responsive pattern control portion 614 further includes a plurality of controls 618 for selecting from possible pattern parameters 222 for the responsive pattern 220.

For instance, the responsive pattern control portion 614 includes a control 618(1) that is useable to define a font size for presenting text content using the responsive pattern 220 described by indication 616. The responsive pattern control portion 614 further includes a control 618(2) that is useable to define an orientation of the content objects 606 and 608 relative to one another when presented using the responsive pattern 220 described by indication 616. Although depicted as including two controls 618 for selecting from possible pattern parameters 222 to be used for a responsive pattern 220 when displayed by a computing device having display characteristics defined by controls of the canvas preview portion 610, the responsive pattern control portion 614 is configured to include any number of controls 618. For instance, in some implementations the responsive pattern control portion 614 is configured to include a control 618 for each pattern parameter 222 associated with the responsive pattern 220 identified by indication 616.

In addition to including controls for defining how content is displayed by the responsive pattern 220, the responsive pattern control portion 614 includes one or more controls 620 that enable a user of the responsive layout system 104 to define a scope of responsive factors 224 that activate the responsive pattern 220. The scope of values for a responsive factor 224 that triggers activation of the responsive pattern 220 is represented as the activation range 226 in the illustrated example of FIG. 2. Each activation range 226 represents a range of values for the corresponding responsive factor 224. In this manner, when a computing device having a responsive factor 224 encompassed by the activation range 226 outputs the responsive document 106, the responsive pattern 220 is used to display content objects 208 included in nodes 206 to which the responsive pattern 220 is assigned.

For instance, in the illustrated example of FIG. 6, the responsive pattern control portion 614 includes a control 620(1) that specifies an activation range 226 of 300 to 1350 pixels for a responsive factor 224 corresponding to a display width associated with a computing device outputting the responsive document 106. The responsive pattern control portion 614 further includes a control 620(2) that specifies an activation range 226 of 100% to 200% of a font size responsive factor 224 associated with the computing device outputting the responsive document 106.

The responsive pattern control portion 614 further includes a control 620(3) that specifies an activation range 226 of 100% to 200% of a line height responsive factor 224 associated with the computing device outputting the responsive document 106. The responsive pattern control portion 614 is finally depicted as including a control 620(m) that specifies an activation range 226 of 0% to 100% of a font magnification responsive factor 224 associated with the computing device outputting the responsive document 106. Although four controls 620 are depicted in the illustrated example of FIG. 6, the responsive pattern control portion 614 is configured to include any number of different controls 620 and m represents any integer.

In the illustrated example of FIG. 6, the controls 620 specify that, for any computing device having display characteristics specifying a display width between 300 and 1350 pixels, a default font size between 100% and 200%, a line height between 100% and 200%, and a text magnification between 0% and 100%, the content objects 606 and 608 are to be output for display in the responsive pattern 220 identified by indication 616 with a font size of 18 and in a horizontal orientation to one another. Because the preview settings defined by the controls 612 specify display characteristics that are encompassed by the respective responsive factor activation ranges defined by controls 620, the content preview portion 604 displays the content objects 606 and 608 in the responsive pattern 220 identified by indication 616 with a font size of 18 and in a horizontal orientation to one another.

Figure 7:
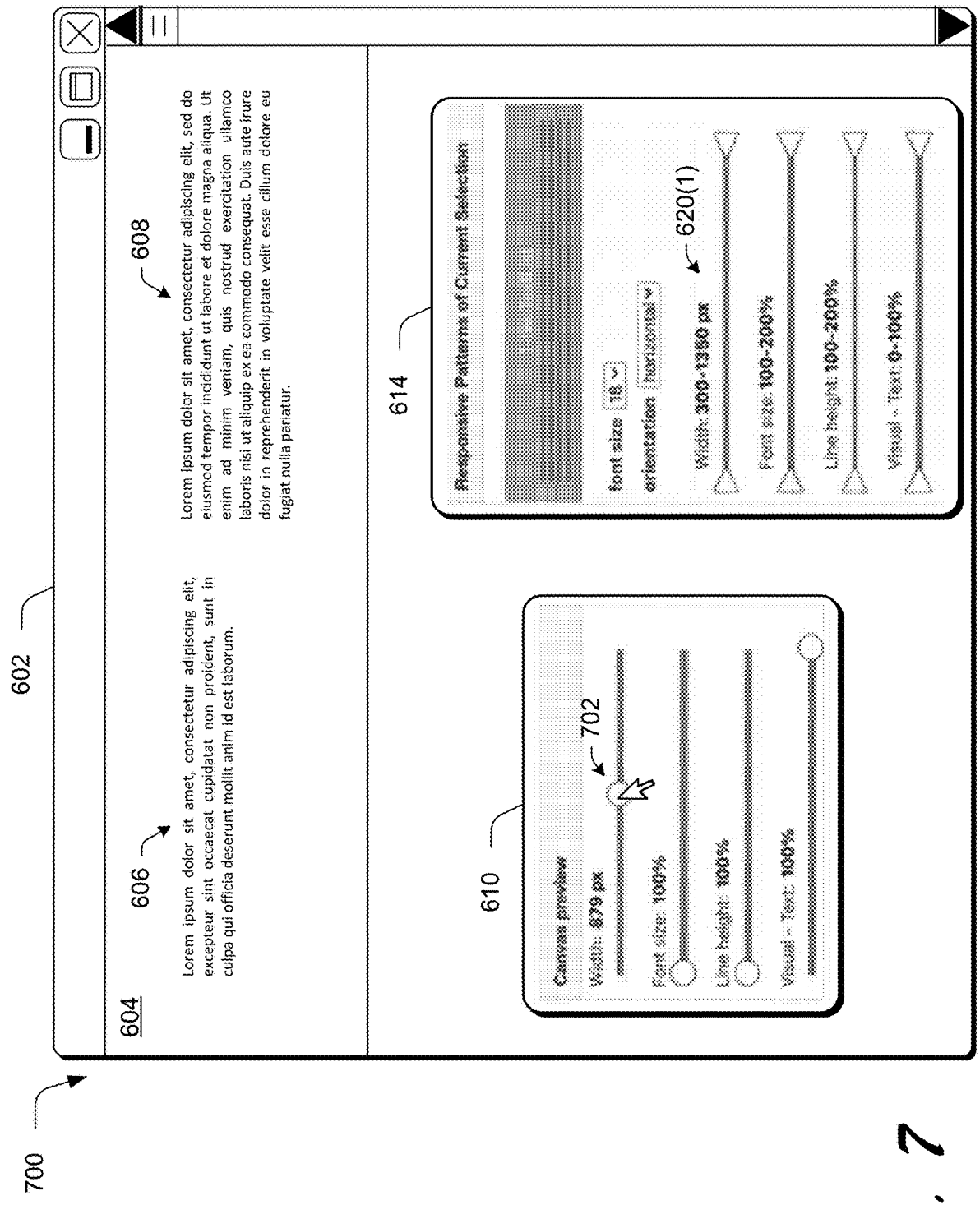

By adjusting a value of the one or more controls 612, a user of the responsive layout system 104 is able to preview a layout associated with a responsive pattern 220 for a defined set of computing device display characteristics. For instance, FIG. 7 depicts an example implementation of the user interface 602 where user modifies a position of the control 612(1) from its position as depicted in FIG. 6 to position 702. As depicted in the illustrated example of FIG. 7, the input adjusting control 612(1) to position 702 adjusts a preview setting for a width display characteristic from 540 pixels to 879 pixels. Because the modified width display characteristic of 879 pixels remains encompassed by the activation range of 300 to 1350 pixels as specified by control 620(1), the responsive pattern 220 described by indication 616 remains activated by the preview settings selected in FIG. 7.

The content preview portion 604 is thus updated to display a layout of content objects 208 included in a node 206 to which the responsive pattern 220 is applied, as output by a computing device having display characteristics defined by the preview settings in canvas preview portion 610. For instance, in FIG. 7 the content objects 606 and 608 are displayed in a wider region of the content preview portion 604 relative to their corresponding depictions in FIG. 6. This specific example enables a user of the responsive layout system 104 to ascertain how a responsive pattern 220 will affect the visual appearance of content objects 606 and 608 when output by display devices having respective widths of 540 pixels and 879 pixels, prior to assigning the specific responsive pattern 220 to a node 206.

Figure 8:
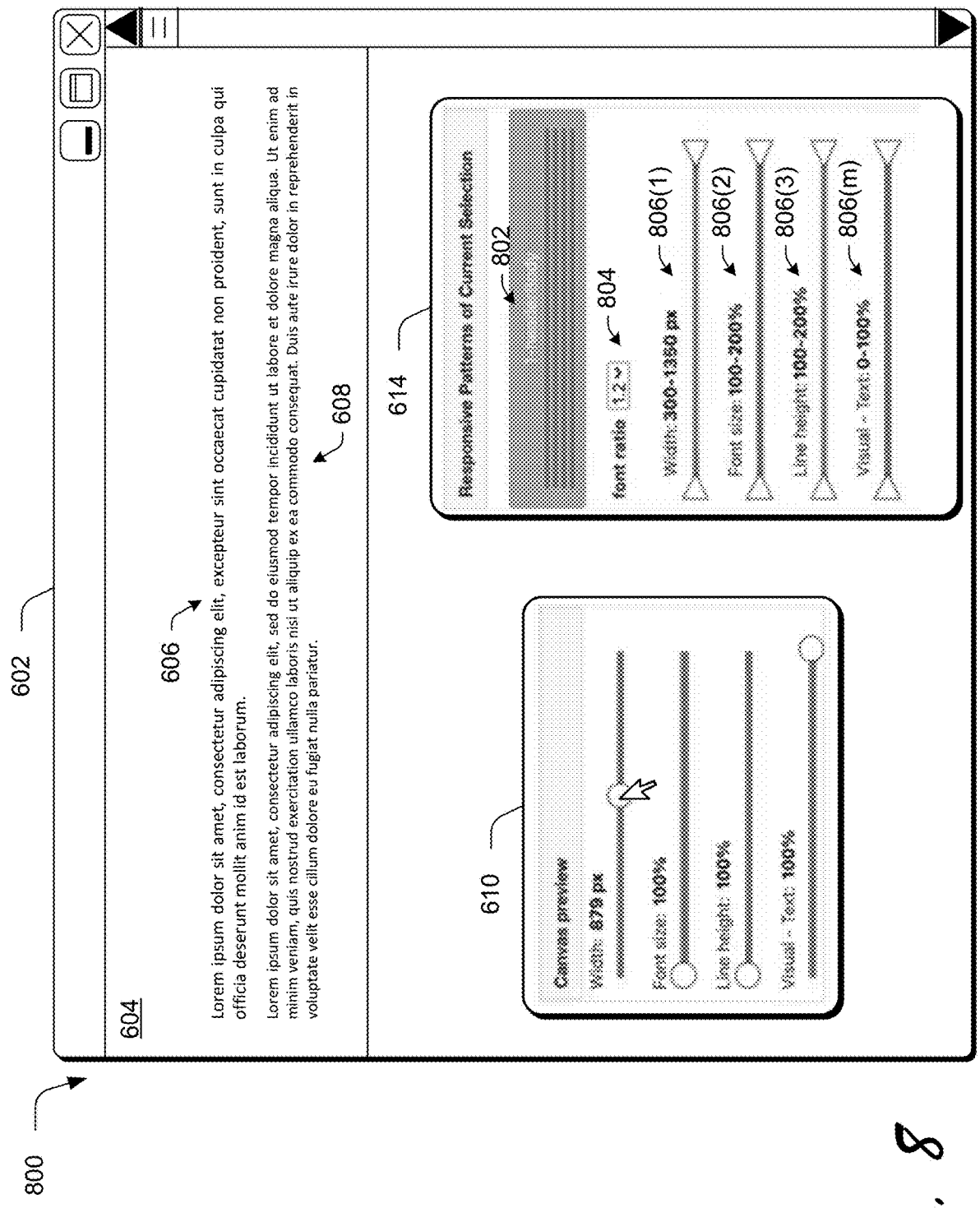

In a comparable manner, the pattern module 216 enables a user of the responsive layout system 104 to preview how a different responsive pattern 220 will affect a display of digital content. For instance, FIG. 8 depicts an instance of an example implementation where the user interface of FIG. 7 is modified to reflect a preview of a different responsive pattern 220 assigned to content objects 606 and 608. In the illustrated example of FIG. 8, the content preview portion 604 is updated to depict a "headerBody" responsive pattern 220 applied to content objects 606 and 608, where content object 606 is designated as a header relative to a body designation of content object 608. This application of a different responsive pattern than previewed in the illustrated examples of FIGS. 6 and 7 is represented by indication 802, which denotes an active preview of the "headerBody" responsive pattern 220. While the preview settings denoted by the one or more controls 612 of canvas preview portion 610 remain unchanged from the illustrated example of FIG. 7, controls of the responsive pattern control portion 614 are updated to correspond to the "headerBody" responsive pattern 220.

For instance, in the illustrated example of FIG. 8, the responsive pattern control portion 614 is updated to include control 804 and controls 806(1)-806(m). Control 804 is useable to select from a plurality of possible pattern parameters 222 for the "headerBody" responsive pattern 220 that define a font size ratio of the header portion to a body portion of the responsive pattern 220. The responsive pattern control portion 614 further includes 806(1)-806(m) that are useable to define activation ranges 226 of respective responsive factors 224 for triggering activation of the headerBody responsive pattern 220.

Specifically, in the illustrated example of FIG. 8, the responsive pattern control portion 614 includes a control 806(1) that specifies an activation range 226 of 300 to 1350 pixels for a responsive factor 224 corresponding to a display width associated with a computing device outputting the responsive document 106. The responsive pattern control portion 614 further includes a control 806(2) that specifies an activation range 226 of 100% to 200% of a font size responsive factor 224 associated with the computing device outputting the responsive document 106.

The responsive pattern control portion 614 further includes a control 806(3) that specifies an activation range 226 of 100% to 200% of a line height responsive factor 224 associated with the computing device outputting the responsive document 106. The responsive pattern control portion 614 is finally depicted as including a control 806(m) that specifies an activation range 226 of 0% to 100% of a font magnification responsive factor 224 associated with the computing device outputting the responsive document 106.

Figure 9:
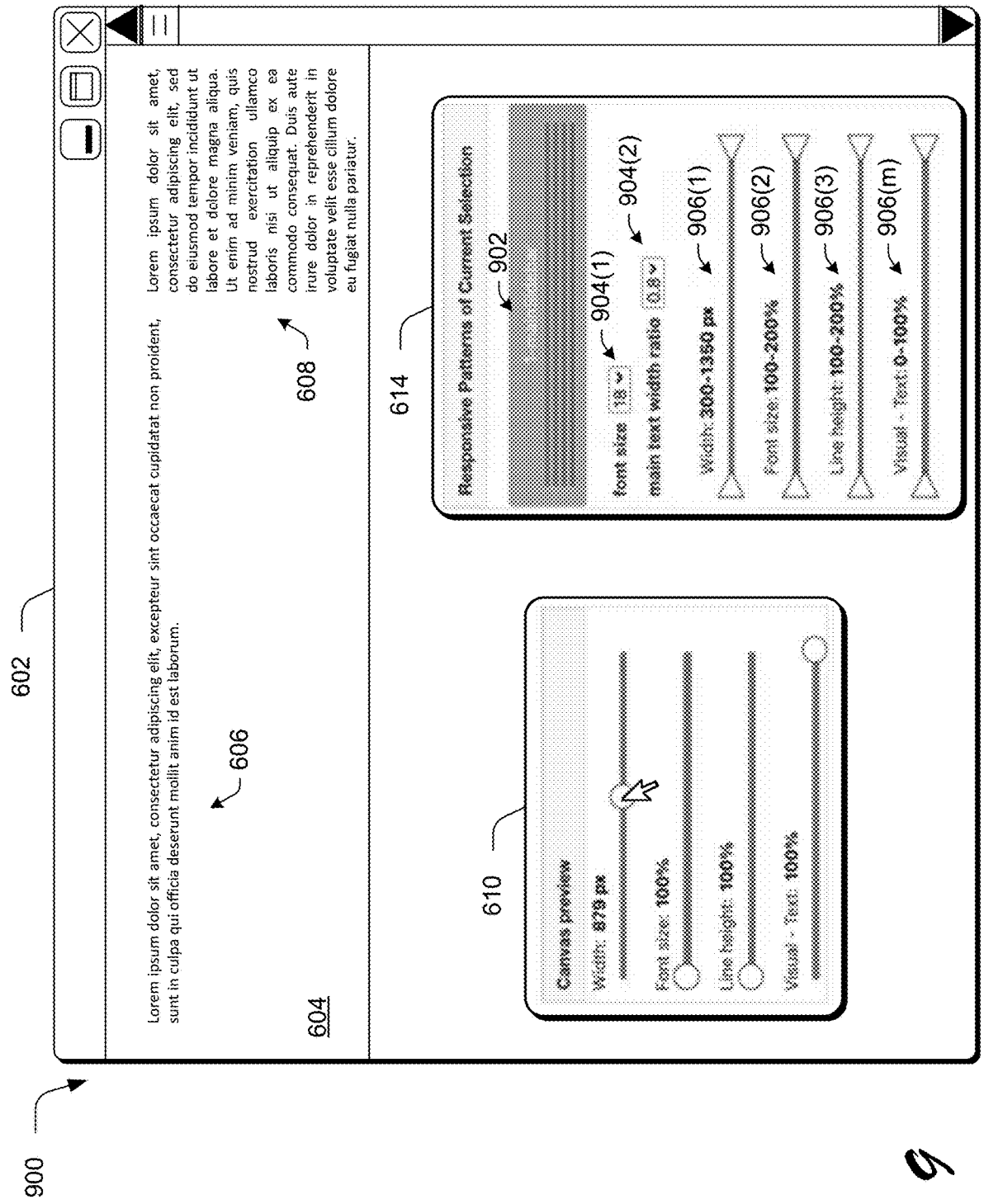

FIG. 9 depicts an instance of an example implementation where the user interface of FIG. 8 is modified to reflect a preview of a different responsive pattern 220 assigned to content objects 606 and 608. In the illustrated example of FIG. 9, the content preview portion 604 is updated to depict a "mainSidebar" responsive pattern 220 applied to content objects 606 and 608, where content object 606 is depicted in a main portion of a user interface and content object 608 is depicted as a sidebar of the main portion. This application of a different responsive pattern than those previewed in the illustrated examples of FIGS. 6-8 is represented by indication 902, which denotes an active preview of the "mainSidebar" responsive pattern 220. Preview settings denoted by the one or more controls 612 of canvas preview portion 610 remain unchanged from the illustrated examples of FIGS. 7 and 8, while controls of the responsive pattern control portion 614 are updated based on the "mainSidebar" responsive pattern 220.

For instance, in the illustrated example of FIG. 9, the responsive pattern control portion 614 is updated to include controls 904(1) and 904(2). Control 904(1) is useable to define a font size pattern parameter 222 for displaying the content objects 606 and 608 using the "mainSidebar" responsive pattern 220. Control 904(2) is useable to define a pattern parameter 222 that specifies a main text width ratio of the main portion to the sidebar portion for the "mainSidebar" responsive pattern 220. In addition to including controls for defining how content is displayed by the responsive pattern 220, the responsive pattern control portion 614 includes controls for defining an activation range 226 of values for individual responsive factors 224 that trigger activation of the responsive pattern 220.

For instance, in the illustrated example of FIG. 9, the responsive pattern control portion 614 includes controls 906(1)-906(m). Control 906(1) specifies an activation range 226 of 300 to 1350 pixels for a responsive factor 224 corresponding to a display width associated with a computing device outputting the responsive document 106. Control 906(2) that specifies an activation range 226 of 100% to 200% for a font size responsive factor 224 associated with the computing device outputting the responsive document 106. Control 906(3) specifies an activation range 226 of 100% to 200% of a line height responsive factor 224 associated with the computing device outputting the responsive document 106. Control 906(m) specifies an activation range 226 of 0% to 100% of a font magnification responsive factor 224 associated with the computing device outputting the responsive document 106.

Thus, as depicted by the illustrated examples of FIGS. 6-9, the responsive pattern control portion 614 is updated based on an actively previewed responsive pattern 220 to include controls that are useable to designate pattern parameters 222 for a responsive pattern 220. The responsive pattern control portion 614 further includes controls that are useable to designate activation ranges 226 for responsive factors 224 that trigger use of the responsive pattern 220 when outputting the responsive document 106. By providing controls that enable designating activation ranges 226 for one or more responsive factors 224, the pattern module 216 is further configured to assign multiple different responsive patterns 220 to one or more nodes 206.

Figure 10:
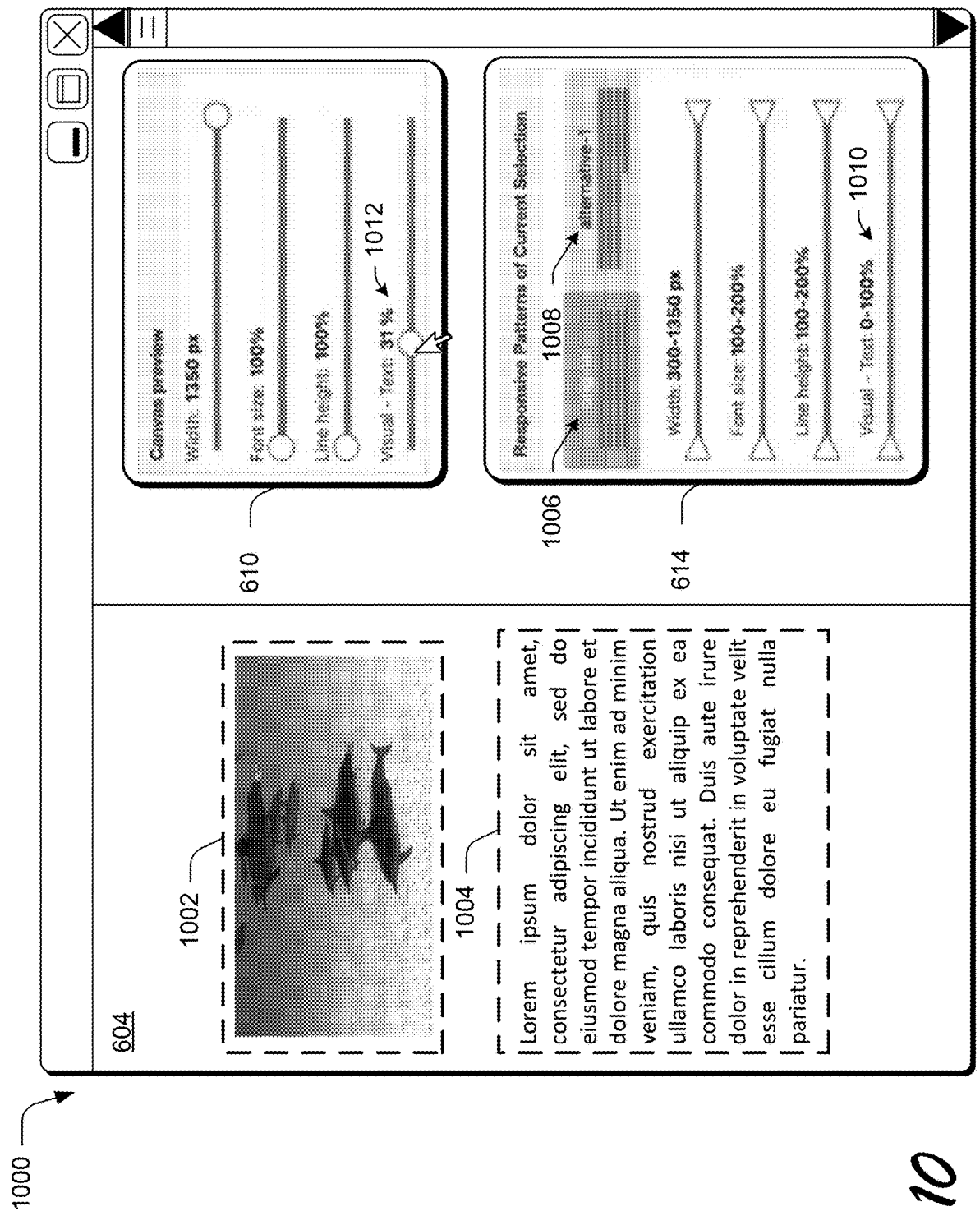

For instance, FIG. 10 depicts an example implementation of a user interface of the responsive layout system 104 when multiple responsive patterns 220 are assigned to nodes 206 linked via a node alternative 214 relationship. For instance, the illustrated example of FIG. 10 represents a user interface output by the responsive layout system 104 in an example implementation of assigning two responsive patterns to content objects linked by an alternative node, such as alternative node 320. In this example with respect to alternative node 320, one of the two responsive patterns specifies content objects associated with group 322 for output, while the other of the two responsive patterns specifies content objects associated with group 324 for output. As described in further detail below, controls of the responsive pattern control portion 614 enable a user of the responsive layout system 104 to define how different computing device display characteristics affect whether the content objects of group 322 or the content objects of group 324 are displayed during output of the responsive document 106.

In the illustrated example of FIG. 10, the content preview portion 604 depicts an image content object 1002 and a text content object 1004. With respect to the example node alternative relationship depicted in FIG. 3, the image content object 1002 is representative of content object 328 included in node 326 and the text content object 1004 is representative of content object 332 included in node 330. The responsive pattern control portion 614 is updated to note that multiple responsive patterns are assigned to content objects associated with the alternative node 320, with indication 1006 representing an "original" responsive pattern 220 and indication 1008 representing an "alternative-1" responsive pattern 220. In the illustrated example, indication 1006 is visually distinguished from indication 1008 (e.g., via shading) to denote that the content depicted in content preview portion 604 is being output using one of the layouts defined by the "original" responsive pattern 220. With continued respect to the example node alternative relationship depicted in FIG. 3 where the image content object 1002 and the text content object 1004 represent content objects 328 and 332, indication 1006 indicates that triggering the "original" responsive pattern causes output of group 322 when displaying the responsive document 106.

Input at the responsive pattern control portion 614 is useable to designate which of the multiple responsive patterns 220 (e.g., which of the "original" or "alternative-1" responsive patterns) governs display of content objects in the content group to which the multiple responsive patterns 220 are assigned. For instance, in the illustrated example of FIG. 10, control 1010 specifies an activation range 226 of 0% to 100% of a font magnification responsive factor 224 associated with the computing device outputting the responsive document 106. The corresponding control 1012 in the canvas preview portion 610 indicates a font magnification display characteristic value of 31% to be used in previewing the multiple responsive patterns, which is encompassed by the activation range specified by control 1010. Because all other preview settings noted by controls of the canvas preview portion 610 are encompassed by the respective activation ranges 226 of corresponding responsive factors 224 for the "original" responsive pattern, the content preview portion 604 displays the image content object 1002 and text content object 1004 according to the "original" responsive pattern.

Figure 11:
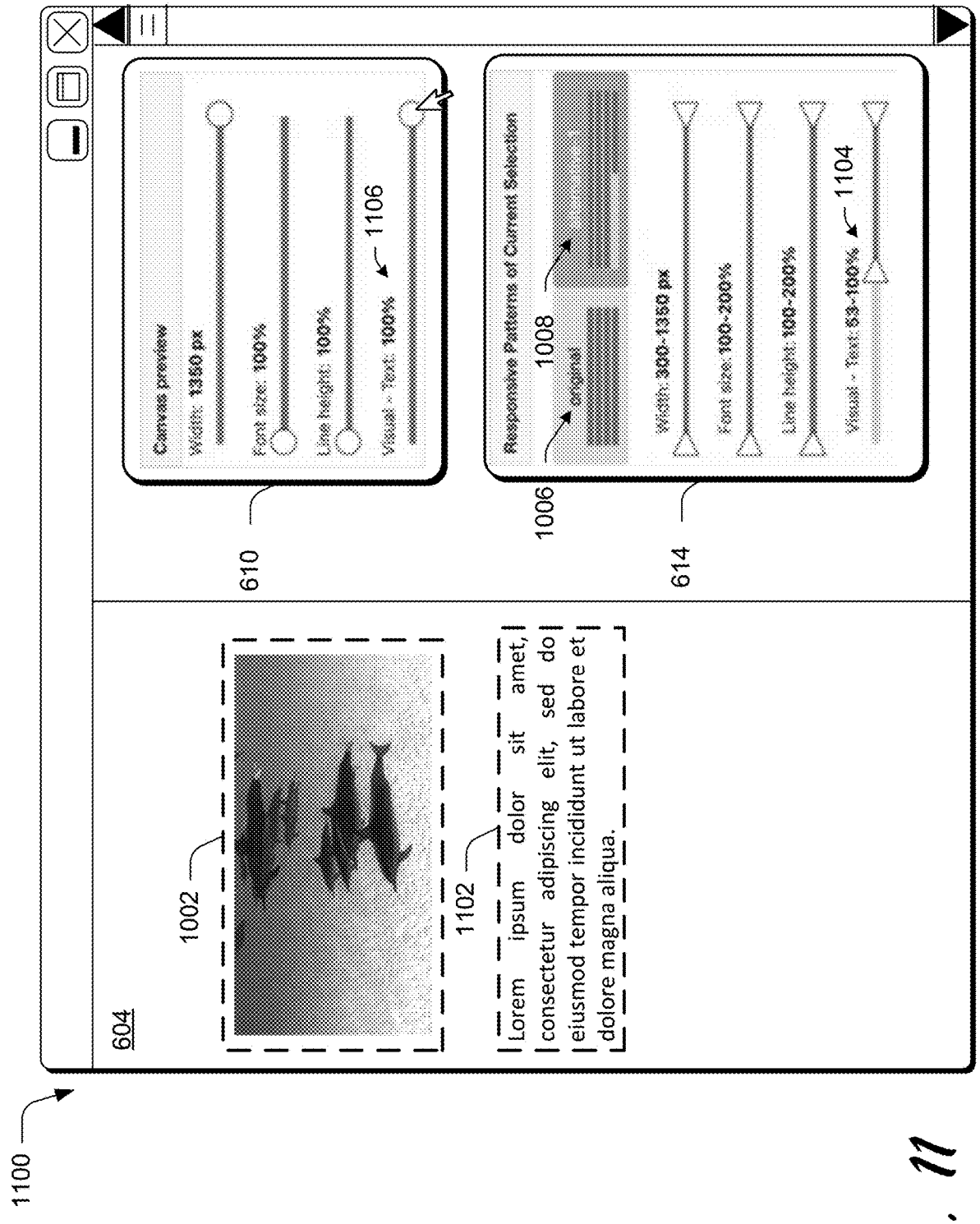

FIG. 11 depicts an example implementation where the preview settings of the responsive pattern control portion 614 are modified to trigger activation of the "alternative-1" responsive pattern of indication 1008 instead of the "original" responsive pattern of indication 1006. In the illustrated example of FIG. 11, the content preview portion 604 is updated to display the image content object 1002 and a text content object 1102 instead of the image content object 1002 and the text content object 1004. With continued respect to the example node alternative relationship depicted in FIG. 3, the text content object 1102 is thus representative of content object 338 included in node 336, and the indication 1008 shows that triggering the "alternative-1" responsive pattern causes output of the group 324 instead of the group 322 when displaying the responsive document 106.

As noted in the responsive pattern control portion 614 of FIG. 11, the "alternative-1" responsive pattern is associated with a different activation range 226 for a font magnification responsive factor 224. As indicated by control 1104, the font magnification responsive factor 224 is associated with an activation range 226 of 53% to 100%. Because the corresponding control 1012 in FIG. 10 designates a preview setting of a 31% font magnification display characteristic, which is not encompassed by the activation range 226 of 53% to 100% for the "alternative-1" responsive pattern, the preview settings of FIG. 10 does not activate display of an "alternative-1" responsive pattern layout in the content preview portion 604. Conversely, because the corresponding control 1106 in FIG. 11 designates a preview setting of a 100% font magnification display characteristic, which is encompassed by the activation range 226 of 53% to 100% for the "alternative-1" responsive pattern, the preview settings of FIG. 11 activate display of an "alternative-1" responsive pattern layout in the content preview portion 604.

With continued respect to the example node alternative relationship depicted in FIG. 3, with the "original" responsive pattern causing output of group 322 and the "alternative-1" responsive pattern causing output of group 324, the content preview portions 604 of FIGS. 10 and 11 provide a visual preview of how content objects associated with alternative node 320 are displayed during output of the responsive document 106 based on display characteristics of different computing devices.

To account for scenarios where computing device display characteristics trigger (e.g., satisfy an activation range 226 for one or more responsive factors 224) multiple responsive patterns 220, the pattern module 216 designates a pattern priority 228 for each responsive pattern 220 assigned to a node 206. For instance, upon assignment of a first responsive pattern 220 to a node 206, the pattern module 216 designates an index value of one for the first responsive pattern 220. Upon assignment of additional responsive patterns 220 to the node 206, the pattern module 216 designates incrementally increasing index values (e.g., two for the second responsive pattern 220, three for the third responsive pattern 220, and so forth).

By assigning a pattern priority 228 to each responsive pattern 220, the pattern module 216 resolves ambiguities as to which of a plurality of responsive patterns 220 assigned to a single node 206 in the pattern assignments 218 is activated when display characteristics satisfy activation ranges for multiple ones of the plurality of responsive patterns. For instance, in the illustrated example of FIG. 11, control 1106 specifies a preview setting of a 100% font magnification display characteristic, which is encompassed by the activation range 226 of 53% to 100% for the "alternative-1" responsive pattern as well as the activation range of 0% to 100% for the "original" responsive pattern. Due to being assigned a higher pattern priority 228, the "alternative-1" responsive pattern 220 is displayed by the content preview portion 604 instead of the "original" responsive pattern 220, thus indicating which of multiple responsive patterns 220 will be displayed when computing device display characteristics trigger two or more of the multiple responsive patterns 220.

To facilitate intuitive assignment and prioritization of various responsive patterns 220, the pattern module 216 is configured to provide user interface tools that recommend responsive patterns 220 appropriate for types of content objects 208. In implementations, responsive pattern recommendations are provided together with user interface tools that enable prioritization of multiple responsive patterns 220 assigned to a single node 206 and define visual aspects of, and responsive factor activation ranges for, individual ones of the multiple responsive patterns.

Figure 12:
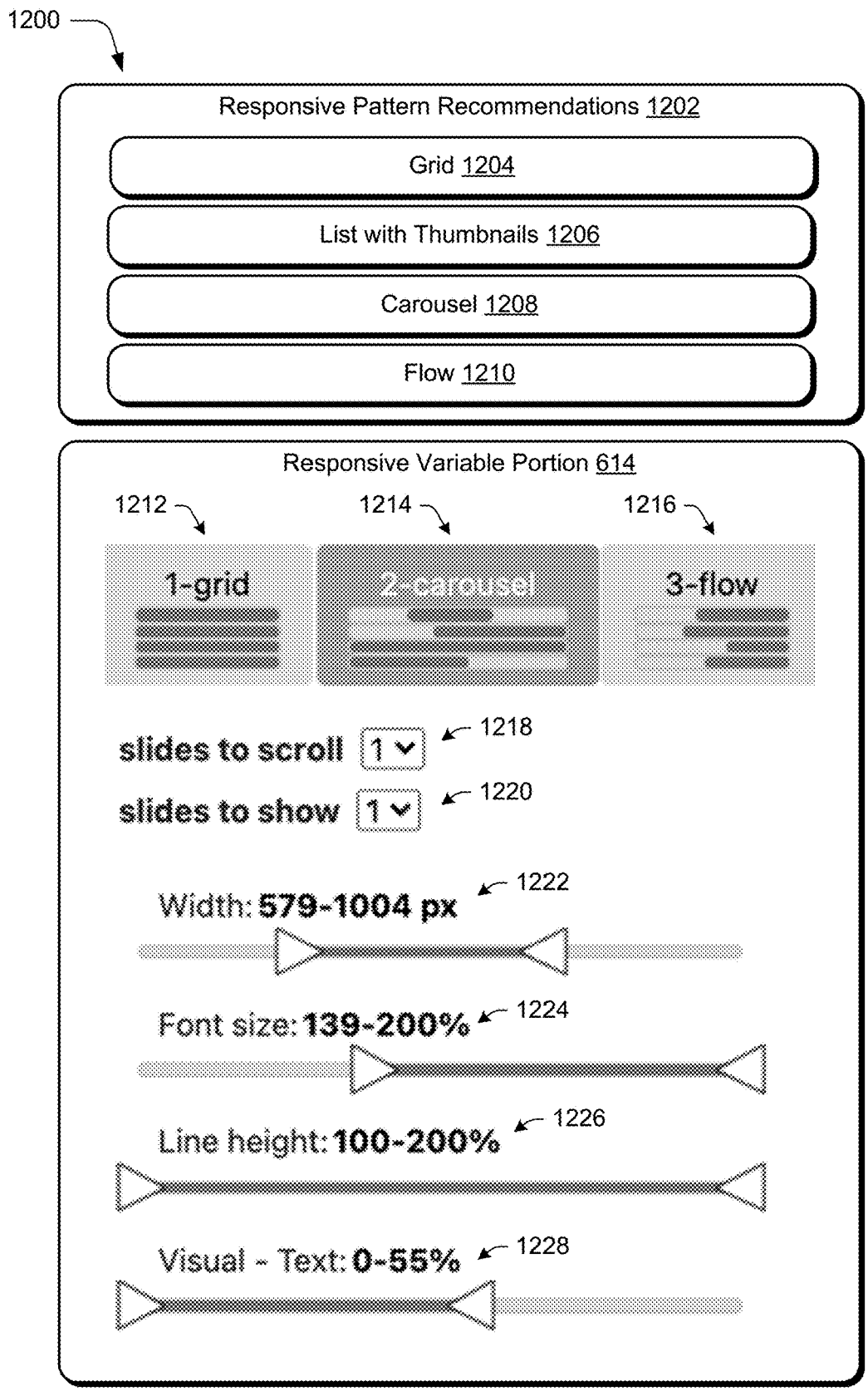

FIG. 12 depicts an example implementation of responsive pattern recommendations 1202 output by the pattern module 216, which is representative of a tool or other user interface component output for display as part of user interface 602. In the illustrated example of FIG. 12, the responsive pattern recommendations 1202 include recommendations for a grid 1204 responsive pattern, a list with thumbnails 1206 responsive pattern, a carousel 1208 responsive pattern, and a flow 1210 responsive pattern. Although displayed as including four recommendations in FIG. 12, the responsive pattern recommendations 1202 is configured to recommend any number of responsive patterns 220. In implementations, responsive patterns 220 are recommended by the pattern module 216 based on one or more types of content objects 208 assigned to a node 206 for which the responsive patterns 220 are being recommended. To do so, the pattern module 216 correlates each responsive pattern 220 with one or more content object 208 types, and outputs responsive pattern recommendations 1202 for responsive patterns 220 having correlated content object types that match a current selection of content objects.

In some implementations, each of the responsive pattern recommendations 1202 is configured as a selectable control, which causes assignment of a corresponding responsive pattern to content objects 208 of a selected node 206 (e.g., content objects 208 being displayed in the content preview portion 604). For instance, the illustrated example of FIG. 12 depicts an example implementation where the grid 1204, carousel 1208, and flow 1210 responsive patterns 220 are selected from the responsive pattern recommendations 1202. These selections are represented by the inclusion of indicators 1212, 1214, and 1216 in the responsive pattern control portion 614.

For instance, indicator 1212 specifies that the grid 1204 responsive pattern is assigned to a node with a pattern priority 228 of one, indicator 1214 specifies that the carousel 1208 responsive pattern is assigned to the node with a pattern priority 228 of two, and indicator 1216 specifies that the flow 1210 responsive pattern is assigned to the node with a pattern priority 228 of three. In an implementation where the pattern module 216 automatically assigns the pattern priority 228 for each responsive pattern 220, the pattern priorities 228 are assigned independent of user input. Alternatively or additionally, the pattern module 216 is configured to assign a pattern priority 228 to a responsive pattern 220 based on user input. For instance, the responsive pattern control portion 614 is configured to enable reprioritization of the grid 1204, carousel 1208, and flow 1210 responsive patterns via user input. Examples of user input for reprioritizing the responsive patterns include adjusting positions of the indicators 1212, 1214, and 1216 relative to one another, textually defining an index value, and so forth.

As described previously, the responsive pattern control portion 614 is further configured to provide controls for defining both a visual appearance of various layouts defined by a responsive pattern 220 as well as defining an activation range 226 for one or more responsive factors 224 to trigger activation of the responsive pattern 220. For instance, in the illustrated example of FIG. 12, the responsive pattern control portion 614 provides controls for customizing the carousel 1208 responsive pattern as applied to one or more nodes 206 in the responsive document 106.

Specifically, the responsive pattern control portion 614 displays a control 1218 that configures a pattern parameter 222 specifying a number of slides to scroll during navigation of a carousel and a control 1220 that configures a pattern parameter 222 specifying a number of slides to display at the carousel at a given time. The responsive pattern control portion 614 further includes a control 1222 that specifies an activation range 226 of 579 to 1004 pixels for a responsive factor 224 corresponding to a display width of a computing device outputting the responsive document 106. The responsive pattern control portion 614 also includes a control 1224 that specifies an activation range 226 of 139% to 200% of a font size responsive factor 224 associated with the computing device outputting the responsive document 106.

The responsive pattern control portion 614 further includes a control 1226 that specifies an activation range 226 of 100% to 200% of a line height responsive factor 224 associated with the computing device outputting the responsive document 106. The responsive pattern control portion 614 is finally depicted as including a control 1228 that specifies an activation range 226 of 0% to 55% of a font magnification responsive factor 224 associated with the computing device outputting the responsive document 106.

In some implementations, the corresponding indicator for the responsive pattern 220, such as indicator 1214, is modified to visually summarize activation ranges 226 for various responsive factors 224 of the responsive pattern 220. For example, in the illustrated example of FIG. 12, indicator 1214 includes four horizontal bars below the textual description indicating that the carousel 1208 responsive pattern is assigned a pattern priority 228 of two. Each of the horizontal bars corresponds to one of controls 1222, 1224, 1226, or 1228, and is visually shaded to depict the corresponding activation range 226 relative to a possible range of values for the corresponding responsive factor 224. In this manner, the responsive pattern control portion 614 enables a user of the responsive layout system 104 to assign responsive patterns 220 to nodes 206, granularly control how individual responsive patterns 220 are activated, and intuitively understand how different responsive patterns 220 are triggered relative to one another.

After designating pattern assignments 218 for each node 206 of the content structure 204, the content structure 204 and the pattern assignments 218 are compiled and output as the responsive document 106.

FIG. 13 depicts an instance of the content structure 204 of FIG. 3 updated to include pattern assignments 218. Specifically, in the illustrated example of FIG. 13, canvas 302 is associated with a pattern assignment 1302. The pattern assignment 1302 is representative of at least one default responsive pattern 220 assigned to each node 206 of the responsive document 106. To ensure that each node 206 is assigned at least one responsive pattern 220, the pattern module 216 propagates the responsive pattern 220 assigned to a parent node (e.g., the canvas 302) to all children of the parent node, subject to override via assignment of one or more different responsive patterns 220. In this manner, group 304 is assigned pattern assignment 1304 and group 314 is assigned pattern assignment 1306. Because alternative node 320 represents a node alternative 214 relationship linking groups 322 and 324, pattern assignment 1308 is commonly assigned to groups 322 and 324. As described above, respective activation ranges 226 of pattern assignment 1308 dictate whether group 322 or group 324 is displayed during output of the responsive document 106. Each of the pattern assignments 1302, 1304, 1306, and 1308 are thus representative of one or more responsive patterns 220 defined in accordance with the techniques described herein.

The responsive document 106 with its content structure 204 and pattern assignments 218 is then output by the responsive layout system 104. The responsive document 106 is thus configured to cause a computing device (e.g., computing device 114, 116, or 118) to output content objects 208 according to responsive patterns having assigned activation ranges 226 that encompass corresponding display characteristics of the computing device.

Having considered example systems and techniques, consider now example procedures to illustrate aspects of the techniques described herein.

EXAMPLE PROCEDURES

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-13.

Figure 14:
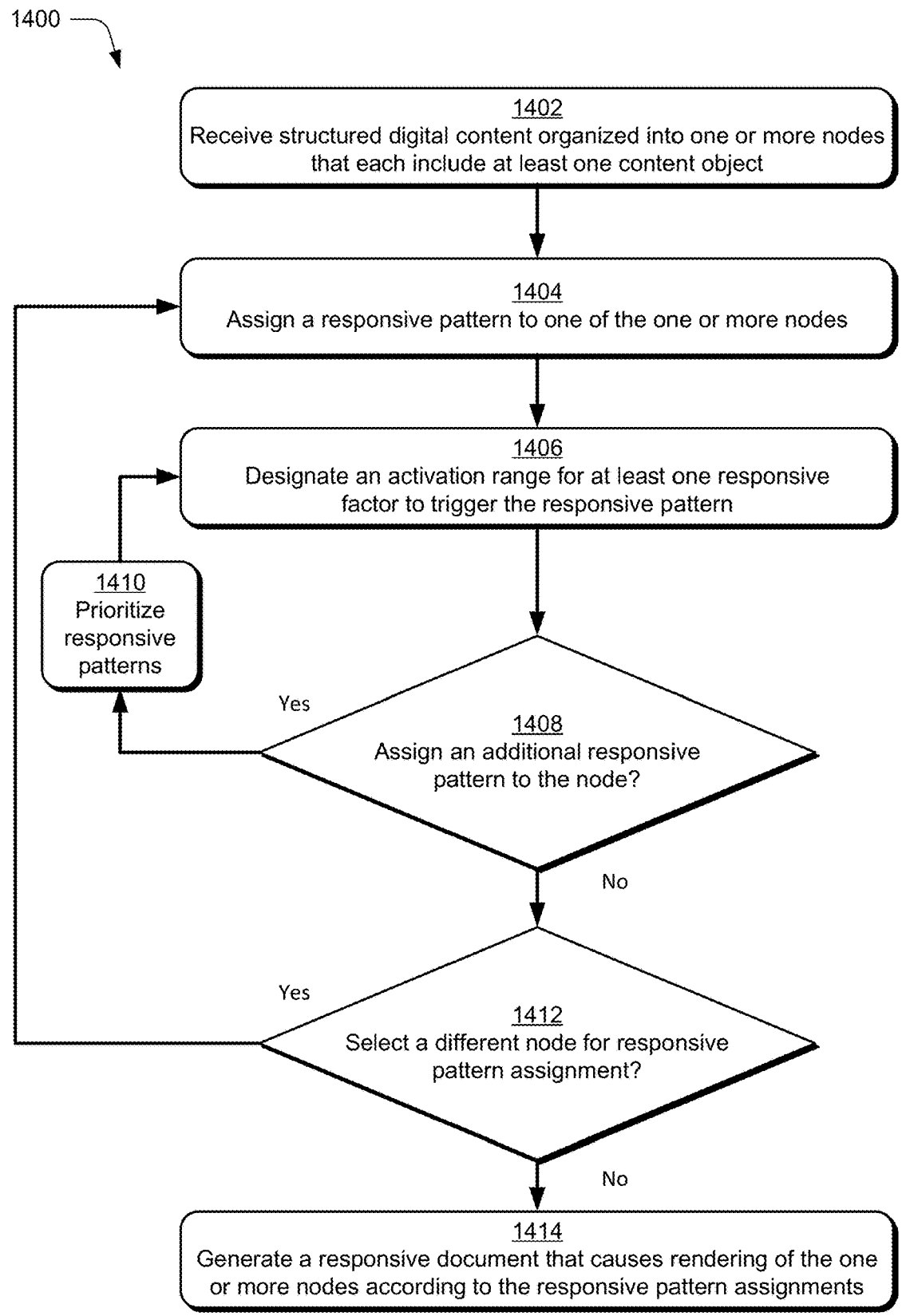
FIG. 14 is a flow diagram depicting a procedure in an example implementation of generating a responsive document using the techniques described herein.

FIG. 14 is a flow diagram depicting a procedure 1400 in an example implementation of generating a responsive document using the techniques described herein. To begin, structured digital content organized into one or more nodes that each include at least one digital content object is received (block 1402). The pattern module 216, for instance, receives a content structure 204 that organizes content objects 208 into a plurality of nodes 206. The content structure 204 further specifies one or more node relationships 210 that describe how different ones of the nodes 206 are related to one another. For instance, example node relationships 210 include one or more node groups 212 indicating that multiple nodes 206 are configured for display with one another as part of a responsive document 106. As another example, node relationships 210 include one or more node alternatives 214 specifying that certain nodes 206 are to be output as alternatives of other nodes 206 during display of the responsive document 106.

A responsive pattern is assigned to one or the one or more nodes (block 1404). The pattern module 216, for instance, assigns a responsive pattern 220 to one of the nodes 206 included in the content structure 204. The responsive pattern 220 includes information describing a plurality of layout configurations for displaying digital content included in the one of the one or more nodes, based on display characteristics of a computing device outputting the responsive document 106.

As part of assigning the responsive pattern to the one of the one or more nodes, an activation range for the at least one responsive factor is designated to trigger the responsive pattern (block 1406). The pattern module 216, for instance, designates an activation range 226 for at least one responsive factor 224 for the responsive pattern 220. In some implementations, designating the activation range 226 for the responsive factor 224 is performed responsive to user input received via controls included in one or more user interfaces output by the responsive layout system 104, such as controls of the responsive pattern control portion 614. In some implementations, the pattern module 216 continues to assign an activation range 226 for one or more additional responsive factors 224 to activate the responsive pattern 220.

After designating the activation range for at least one responsive factor of the responsive pattern, a determination is made as to whether an additional responsive pattern is to be assigned to the one of the one or more nodes (block 1408). In response to determining that an additional responsive pattern 220 is to be assigned to the node 206, the pattern module 216 assigns an index value designating a pattern priority 228 for the previously assigned responsive pattern 220 to prioritize responsive patterns assigned to the node 206 (block 1410). After prioritizing the previously assigned responsive pattern 220, operation returns to block 1406, and the pattern module 216 continues to designate activation ranges 226 for one or more responsive factors 224 to activate the responsive pattern 220. At block 1408, responsive to determining that no additional responsive pattern is to be applied to the one of the one or more nodes, operation proceeds to block 1412.

A determination is then made as to whether a different node should be selected for at least one responsive pattern assignment (block 1412). In response to determining that a different node should be selected for at least one responsive pattern assignment, operation returns to block 1404, and the pattern module 216 continues to assign additional responsive patterns 220 to the node 206, and operation flows through blocks 1404, 1406, 1408 and 1412 until a determination is made that no additional nodes are to be selected for at least one responsive pattern assignment.

Upon such a determination, a responsive document that causes rendering of the one or more nodes according to the responsive pattern assignments is generated (block 1414). The responsive layout system 104, for instance, compiles the content structure 204 and the pattern assignments 218 to generate the responsive document 106.

Figure 15:
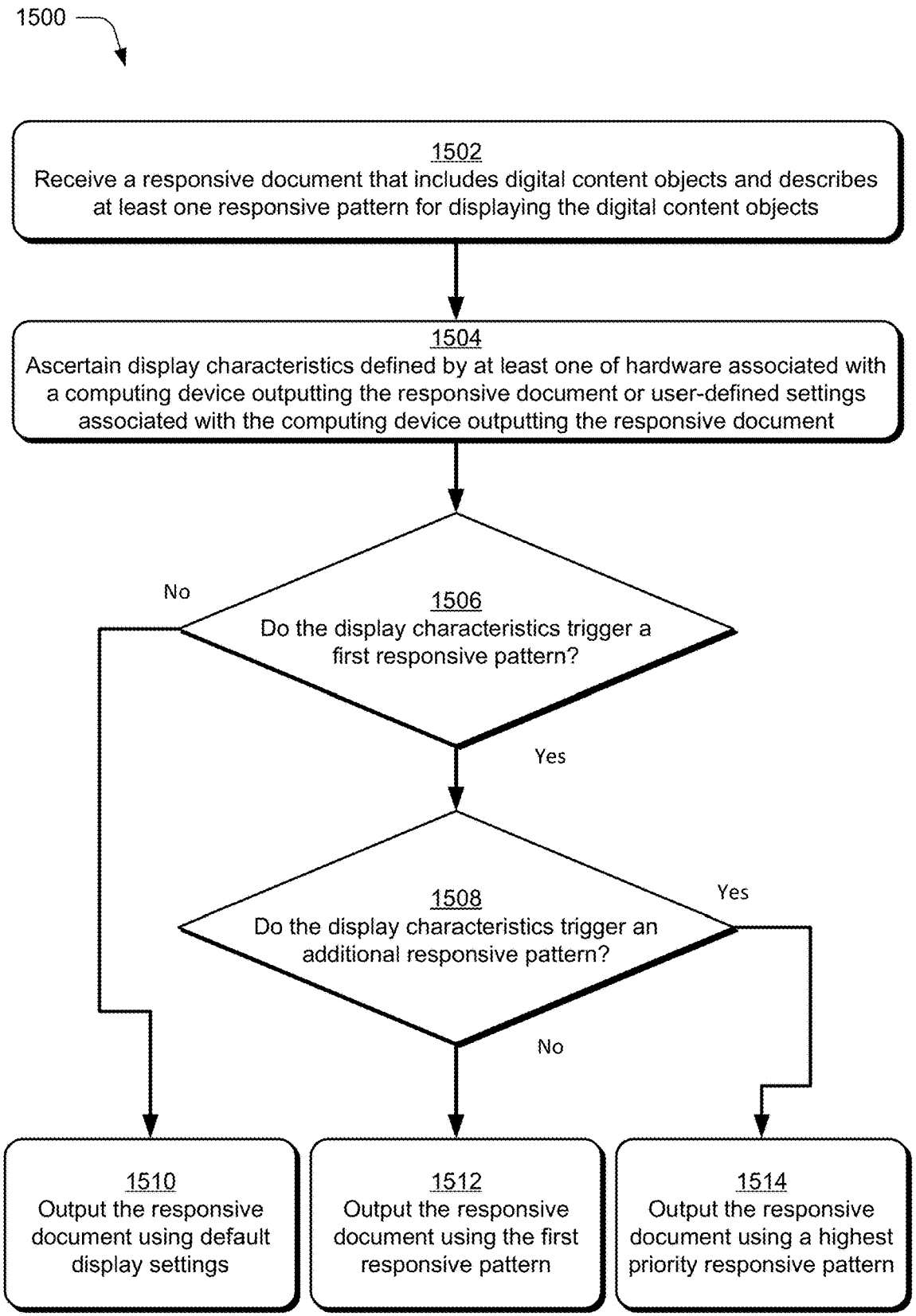
FIG. 15 is a flow diagram depicting a procedure in an example implementation of rendering a responsive document generated using the techniques described herein.

FIG. 15 is a flow diagram depicting a procedure 1500 in an example implementation of rendering a responsive document generated using the techniques described herein.

A responsive document that includes digital content objects and describes at least one responsive pattern for displaying the digital content objects is received (block 1502). The computing device 114, for instance, receives the responsive document 106 as a content structure 204 with associated pattern assignments 218 that define at least one responsive pattern 220 for displaying content objects 208 associated with each of one or more nodes 206 included in the content structure 204.

Display characteristics defined by at least one of hardware associated with a computing device outputting the responsive document or user-defined settings associated with the computing device outputting the responsive document are ascertained (block 1504). The computing device 114, for instance, ascertains display characteristics defined by one or more hardware components of the computing device 114, one or more settings defined by a user of the computing device 114, or combinations thereof.

A determination is made as to whether the computing device display characteristics trigger a first responsive pattern (block 1506). The computing device 114 for instance, identifies one or more responsive factors 224 associated with the first responsive pattern and determines whether the computing device display characteristics are encompassed by corresponding activation ranges 226 for each of the responsive factors 224. In response to determining that the computing device display characteristics trigger the first responsive pattern, operation proceeds to block 1508. Alternatively, in response to determining that the computing device display characteristics do not trigger the first responsive pattern, the responsive document is output using default display settings (block 1510). In some implementations, the computing device 114 outputs the responsive document 106 using default display settings (e.g., default settings for the computing device 114 defined independent of the responsive document 106). Alternatively, the computing device 114 outputs the responsive document 106 using default display settings defined by a parent node of the responsive document 106, such as the pattern assignment 1302 assigned to the canvas 302.

Alternatively, in response to determining that the computing device display characteristics trigger the first responsive pattern, a determination is made as to whether the computing device display characteristics trigger an additional responsive pattern (block 1508). The computing device 114 for instance, identifies one or more responsive factors 224 associated with an additional responsive pattern and determines whether the computing device display characteristics are encompassed by corresponding activation ranges 226 for each of the responsive factors 224 of the additional responsive pattern.

In response to determining that the computing device display characteristics are not encompassed by corresponding activation ranges 226 for each of the responsive factors 224 of the additional responsive pattern, the responsive document is output using the first responsive pattern (block 1512). Alternatively, in response to determining that the computing device display characteristics are encompassed by corresponding activation ranges 226 for each of the responsive factors 224 of the additional responsive pattern, the responsive document is output using a highest priority responsive pattern (block 1514). The computing device 114, for instance, identifies a responsive pattern 220 with responsive factor 224 activation ranges 226 satisfied by the computing device display characteristics having a highest pattern priority 228 and outputs the responsive document 106 using the highest-priority responsive pattern 220. Operation of FIG. 15 continues by returning to block 1506 for each of a plurality of nodes 206 defined by a content structure 204 for the responsive document 106, such that output of content objects 208 associated with each node 206 is constrained by one or more responsive patterns 220 assigned to the node 206.

Having described example procedures in accordance with one or more implementations, consider now an example system and device to implement the various techniques described herein.

Example System and Device

Figure 16:
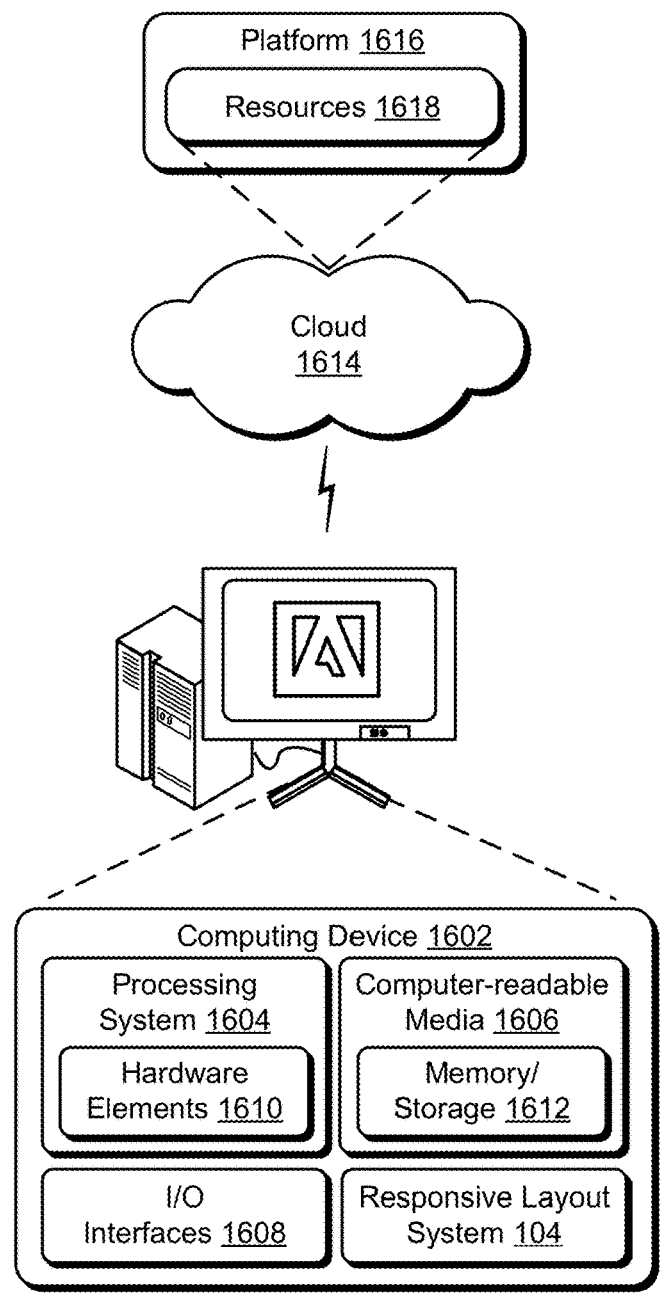
FIG. 16 illustrates an example system including various components of an example device to implement the techniques described with reference to FIGS. 1-15.

FIG. 16 illustrates an example system 1600 that includes an example computing device 1602, which is representative of one or more computing systems and/or devices that implement the various techniques described herein. This is illustrated through inclusion of the responsive layout system 104. The computing device 1602 is configured, for example, as a service provider server, as a device associated with a client (e.g., a client device), as an on-chip system, and/or as any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware.

Accordingly, the processing system 1604 is illustrated as including hardware element 1610 that are configurable as processors, functional blocks, and so forth. For instance, hardware element 1610 is implemented in hardware as an application specific integrated circuit or other logic device formed using one or more semiconductors. The hardware elements 1610 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1606 is illustrated as including memory/storage 1612. The memory/storage 1612 represents memory/storage capacity associated with one or more computer-readable media. The memory/storage 1612 is representative of volatile media (such as random-access memory (RAM)) and/or nonvolatile media (such as read only memory (ROM), Flash memory, optical disks, magnetic disks, and so forth). The memory/storage 1612 is configured to include fixed media (e.g., RAM, ROM, a fixed hard drive, and so on) as well as removable media (e.g., Flash memory, a removable hard drive, an optical disc, and so forth). In certain implementations, the computer-readable media 1606 is configured in a variety of other ways as further described below.

Input/output interface(s) 1608 are representative of functionality to allow a user to enter commands and information to computing device 1602 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1610. The computing device 1602 is configured to implement instructions and/or functions corresponding to the software and/or hardware modules. Accordingly, implementation of a module that is executable by the computing device 1602 as software is achieved at least partially in hardware, e.g., through use of computer-readable storage media and/or hardware elements 1610 of the processing system 1604. The instructions and/or functions are executable/operable by one or more articles of manufacture (for example, one or more computing devices 1602 and/or processing systems 1604) to implement techniques, modules, and examples described herein.

The techniques described herein are supported by various configurations of the computing device 1602 and are not limited to the specific examples of the techniques described herein. This functionality is further configured to be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 include applications and/or data that is utilized while computer processing is executed on servers that are remote from the computing device 1602. Resources 1618 also include services provided over the Internet and/or through a subscriber network, such as a cellular or Wi-Fi network.

The platform 1616 is configured to abstract resources and functions to connect the computing device 1602 with other computing devices. The platform 1616 is further configured to abstract scaling of resources to provide a corresponding level of scale to encountered demand for the resources 1618 that are implemented via the platform 1616. Accordingly, in an interconnected device embodiment, implementation of functionality described herein is configured for distribution throughout the system 1600. For example, in some configurations the functionality is implemented in part on the computing device 1602 as well as via the platform 1616 that abstracts the functionality of the cloud 1614.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
   receiving, by a computing device, structured digital content organized into one or more groups that each include at least one content object;
   assigning, by the computing device, a plurality of responsive patterns to a group of the one or more groups, each of the plurality of responsive patterns defining a plurality of layout configurations for displaying digital content included in the group of the one or more groups based on responsive factors;
   outputting, by the computing device, a responsive pattern control portion including a first set of controls for defining how the structured digital content is displayed by the plurality of responsive patterns and a second set of controls for defining activation ranges of the responsive factors that activate the plurality of responsive patterns;
   designating, by the computing device, based on a first input received via the second set of controls of the responsive pattern control portion, a first activation range that defines values for the responsive factors to activate a first responsive pattern of the plurality of responsive patterns;
   designating, by the computing device, based on a second input received via the second set of controls of the responsive pattern control portion, a second activation range that defines different values for the responsive factors to activate a second responsive pattern of the plurality of responsive patterns, the second responsive pattern of the plurality of responsive patterns being different than the first responsive pattern of the plurality of responsive patterns; and
   generating, by the computing device, a responsive document to cause a device that renders the responsive document to display the structured digital content included in the group of the one or more groups using either the first responsive pattern of the plurality of responsive patterns or the second responsive pattern of the plurality of responsive patterns.

2. The method of claim 1, wherein assigning the plurality of responsive patterns to the group of the one or more groups comprises assigning the plurality of responsive patterns to at least one additional group of the one or more groups, the at least one additional group being a child of the group of the one or more groups in the structured digital content.

3. The method of claim 1, further comprising designating the second activation range as a higher priority than the first activation range, wherein the different values defined by the second activation range are encompassed by the values defined by the first activation range.

4. The method of claim 1, wherein designating the first activation range comprises defining a first set of values for a first responsive factor of the responsive factors to activate the first responsive factor of the plurality of responsive patterns and defining a second set of values for a second responsive factor of the responsive factors to activate the first responsive factor of the plurality of responsive patterns.

5. The method of claim 1, further comprising generating the structured digital content by displaying a plurality of digital content objects in a user interface and receiving one or more inputs that group at least two of the plurality of digital content objects into one of the one or more groups.

6. The method of claim 1, wherein designating the first activation range comprises outputting a third set of controls for defining preview settings for at least one of the responsive factors and displaying a preview of the first responsive pattern of the plurality of responsive patterns based on the preview settings.

7. The method of claim 1, wherein each of the one or more groups specifies that the at least one content object is to be presented with other content objects included in the group, the at least one content object comprising text, an image, or a video.

8. The method of claim 1, further comprising generating a recommendation for the plurality of responsive patterns based on the at least one content object included in the group of the one or more groups.

9. The method of claim 1, wherein the responsive factors comprise a font size responsive factor, a line height responsive factor, or a font magnification responsive factor.

10. The method of claim 9, wherein the first activation range comprises a first range of percentages and the second activation range comprises a second range of percentages, and further comprising:
    presenting, by the computing device, via the responsive pattern control portion, a plurality of responsive pattern recommendations and a corresponding priority for each of the plurality of responsive pattern recommendations;
    receiving, by the computing device, via the responsive pattern control portion, a selection of a specific responsive pattern recommendation from the plurality of responsive pattern recommendations; and
    automatically adjusting, by the computing device, the first range of percentages and the second range of percentages based upon the selection.

11. One or more computer-readable storage media storing instructions that, responsive to execution by a computing device, cause the computing device to perform operations comprising:

receiving structured digital content organized into one or more groups that each include at least one content object;

assigning a plurality of responsive patterns to a group of the one or more groups, each of the plurality of responsive patterns defining a plurality of layout configurations for displaying the structured digital content included in the group of the one or more groups based on responsive factors;

outputting a responsive pattern control portion including a first set of controls for defining how the structured digital content is displayed by the plurality of responsive patterns and a second set of controls for defining an activation ranges of the responsive factors that activatd the plurality of responsive patterns;

designating, based on a first input received via the second set of controls of the responsive pattern control portion, a first activation range that defines values for the responsive factors to activatd a first responsive pattern of the plurality of responsive patterns;

designating, based on a second input received via the second set of controls of the responsive pattern control portion, a second activation range that defines different values for the responsive factors to activate a second responsive pattern of the plurality of responsive patterns, the second responsive pattern of the plurality of responsive patterns being different than the first responsive pattern of the plurality of responsive patterns; and generating a responsive document to cause a device that renders the responsive document to display the structured digital content included in the group of the one or more groups using either the first responsive pattern of the plurality of responsive patterns or the second responsive pattern of the plurality of responsive patterns.

12. The one or more computer-readable storage media of claim 11, the operations further comprising assigning an additional responsive pattern to the group of the one or more groups, the additional responsive pattern being different from the first responsive pattern and the second responsive pattern, and the additional responsive pattern being activated by a different activation range.

13. The one or more computer-readable storage media of claim 11, wherein organizing the structured digital content into the one or more groups comprises displaying a plurality of digital content objects in a user interface and receiving one or more inputs that group at least two of the plurality of digital content objects into one of the one or more groups.

14. The one or more computer-readable storage media of claim 11, wherein each of the one or more groups specifies that the at least one content object is to be presented with other content objects included in the group, the at least one content object comprising text, an image, or a video.

15. The one or more computer-readable storage media of claim 11, the operations further comprising generating a recommendation for the first responsive pattern or the second responsive pattern based on digital content objects included in the group of the one or more groups.

16. The one or more computer-readable storage media of claim 11, wherein designating the first activation range comprises outputting a user interface that includes controls for defining preview settings; the operations further comprising displaying a preview of the first responsive pattern in response to receiving further input at the controls designating a first preview setting for a first range of values and a second preview setting for a second range of values.

17. A system comprising:

one or more processors; and a computer-readable storage medium storing instructions that are executable by the one or more processors to perform operations including:

receiving structured digital content organized into one or more groups that each include at least one content object;

assigning a plurality of responsive patterns to a group of the one or more groups, each of the plurality of responsive patterns defining a plurality of layout configurations for displaying digital content included in the group of the one or more groups based on responsive factors;

outputting a responsive pattern control portion, the responsive pattern control portion including a first set of controls for defining how the structured digital content is displayed by the plurality of responsive patterns and a second set of controls that define activation ranges of the responsive factors that activate the plurality of responsive patterns;

designating, based on a first input received via the second set of controls of the responsive pattern control portion, a first activation range that defines values for the responsive factors to activate a first responsive pattern of the plurality of responsive patterns;

designating, based on a second input received via the second set of controls of the responsive pattern control portion, a second activation range that defines different values for the responsive factors to activate a second responsive pattern of the plurality of responsive patterns, the second responsive pattern of the plurality of responsive patterns being different than the first responsive pattern of the plurality of responsive patterns; and generating a responsive document to cause a device that renders the responsive document to display the structured digital content included in the group of the one or more groups using either the first responsive pattern of the plurality of responsive patterns or the second responsive pattern of the plurality of responsive patterns.

18. The system of claim 17, wherein the responsive factors comprise a font size responsive factor.

19. The system of claim 17, wherein the responsive factors comprise a line height responsive factor.

20. The system of claim 17, wherein the responsive factors comprise a font magnification responsive factor.

* * * * *

UNITED STATES PATENT AND TRADEMARK OFFICE
CERTIFICATE OF CORRECTION

PATENT NO. : 11,922,110 B2
APPLICATION NO. : 17/535067
DATED : March 5, 2024
INVENTOR(S) : Vlad Ion Morariu et al.

It is certified that error appears in the above-identified patent and that said Letters Patent is hereby corrected as shown below:

In the Claims

Column 27 Line 15, delete "activatd", insert -- activate --, therefor.

Column 27 Line 19, after "factors to", delete "activatd" insert -- activate --, therefor.

Signed and Sealed this
Seventh Day of May, 2024

Katherine Kelly Vidal
Director of the United States Patent and Trademark Office